(12) United States Patent
Minamisawa et al.

(10) Patent No.: US 9,459,464 B2
(45) Date of Patent: Oct. 4, 2016

(54) LENS DRIVE DEVICE

(75) Inventors: Shinji Minamisawa, Nagano (JP); Katsushige Yanagisawa, Nagano (JP); Tatsuki Wade, Nagano (JP); Tadashi Takeda, Nagano (JP); Kiyoshi Miyazaki, Nagano (JP); Hisahiro Ishihara, Nagano (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 1064 days.

(21) Appl. No.: 13/518,134

(22) PCT Filed: Dec. 16, 2010

(86) PCT No.: PCT/JP2010/072607
§ 371 (c)(1),
(2), (4) Date: Jul. 17, 2012

(87) PCT Pub. No.: WO2011/078040
PCT Pub. Date: Jun. 30, 2011

(65) Prior Publication Data
US 2013/0201559 A1    Aug. 8, 2013

(30) Foreign Application Priority Data

Dec. 25, 2009  (JP) .................. 2009-293732

(51) Int. Cl.
*G02B 27/64* (2006.01)
*G02B 7/08* (2006.01)
(Continued)

(52) U.S. Cl.
CPC .............. *G02B 27/646* (2013.01); *G02B 7/08* (2013.01); *G03B 3/10* (2013.01); *G03B 5/02* (2013.01);
(Continued)

(58) Field of Classification Search
CPC .............. G02B 27/64; G02B 27/646–27/648; H04N 5/23248–5/23264; H04N 5/2328; H04N 5/23287; G03B 5/00–5/02; G03B 2205/0007–2205/0015
USPC ................ 359/554–557, 811, 813–814, 819, 359/822–824; 396/52–55; 356/4.04; 348/208.99, 208.1–208.5, 348/208.7–208.11, 208.12–208.13
See application file for complete search history.

(56) References Cited

U.S. PATENT DOCUMENTS

| | | | | |
|---|---|---|---|---|
| 8,224,169 B2 * | 7/2012 | Tsuruta | .................. | G02B 7/022 348/208.11 |
| 2008/0278831 A1 * | 11/2008 | Chang | .................... | G02B 7/026 359/819 |

FOREIGN PATENT DOCUMENTS

| | | | |
|---|---|---|---|
| JP | 2007-183488 A | 7/2007 | |
| JP | 2008-58659 A | 3/2008 | |

(Continued)

OTHER PUBLICATIONS

International Search Report for International application No. PCT/JP2010/072607 mailing date of Jan. 18, 2011 with English translation.

*Primary Examiner* — Kimberly N Kakalec
*Assistant Examiner* — James McGee
(74) *Attorney, Agent, or Firm* — Beyer Law Group LLP

(57) ABSTRACT

A lens drive device may include a first holding body, a second holding body, a fixed body which holds the second holding body, a first drive mechanism to drive the first holding body, a second drive mechanism to drive the second holding body, a third drive mechanism structured to drive the second holding body in a different direction than the second drive mechanism, an elastic member having a fixed part which is fixed to the second holding body and a deformable part, and plural wires in a substantially straight line shape with one end side fixed to the deformable part and the other end side fixed to the fixed body.

17 Claims, 12 Drawing Sheets

(51) Int. Cl.
  *G03B 3/10* (2006.01)
  *G03B 5/02* (2006.01)
  *H04N 5/225* (2006.01)
  *H02K 41/03* (2006.01)
  *H04N 5/232* (2006.01)

(52) U.S. Cl.
  CPC .......... *H02K 41/031* (2013.01); *H04N 5/2254* (2013.01); *H04N 5/2328* (2013.01); *H04N 5/23258* (2013.01); *G03B 2205/0007* (2013.01); *H02K 2201/18* (2013.01)

(56) References Cited

FOREIGN PATENT DOCUMENTS

| | | |
|---|---|---|
| JP | 2009-9027 A | 1/2009 |
| WO | 2009/133691 A1 | 11/2009 |

* cited by examiner

Fig. 1
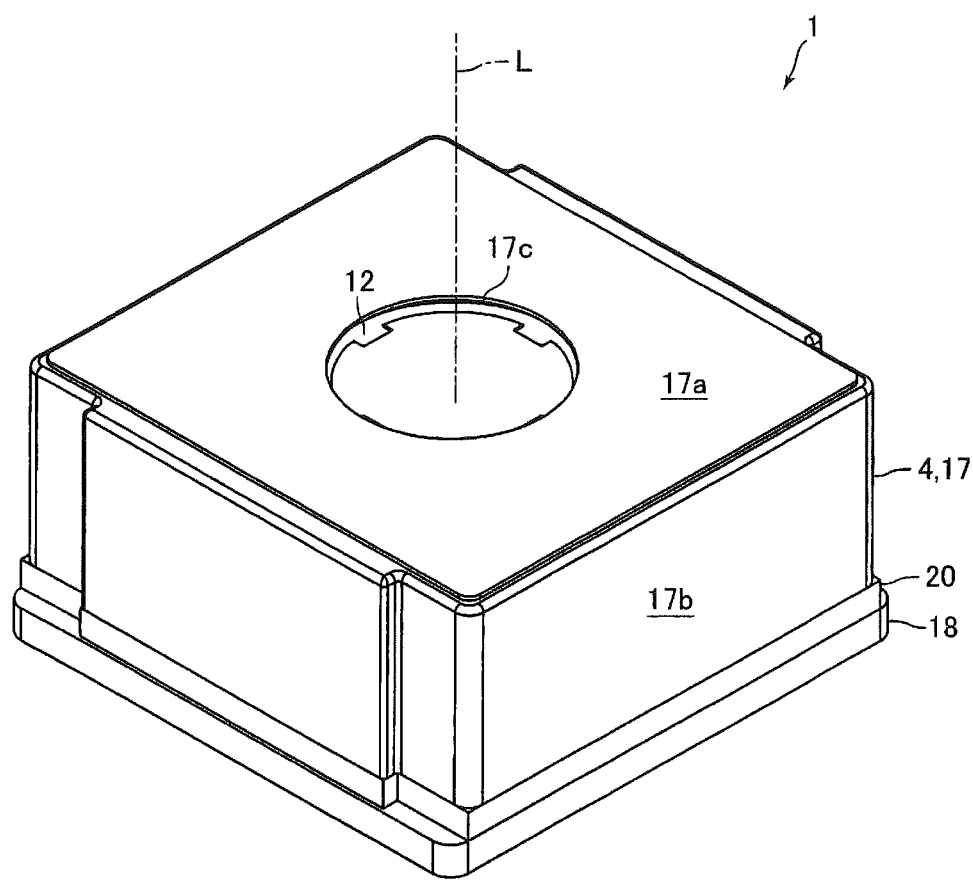
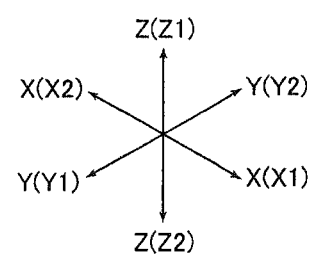

Fig. 3
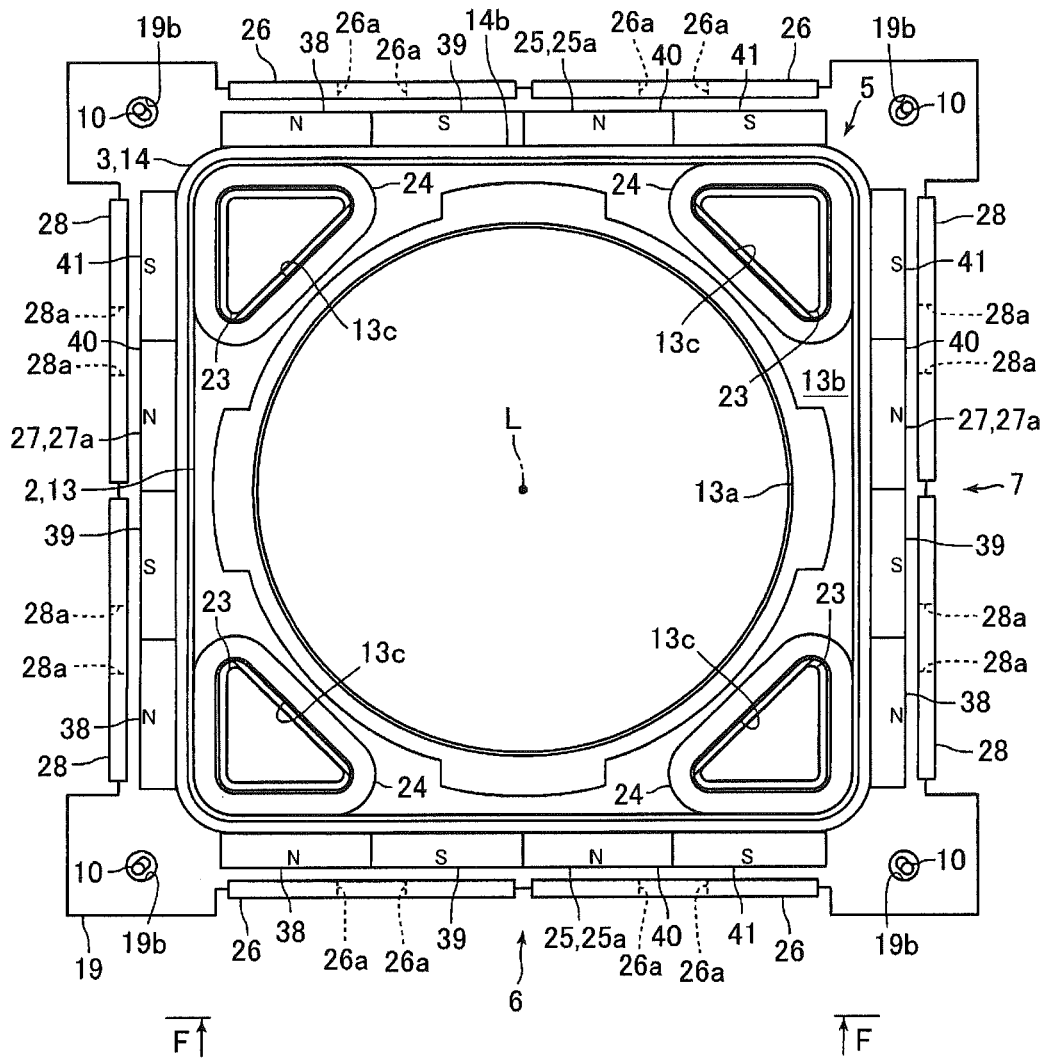
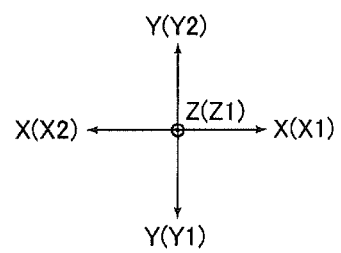

Fig. 5
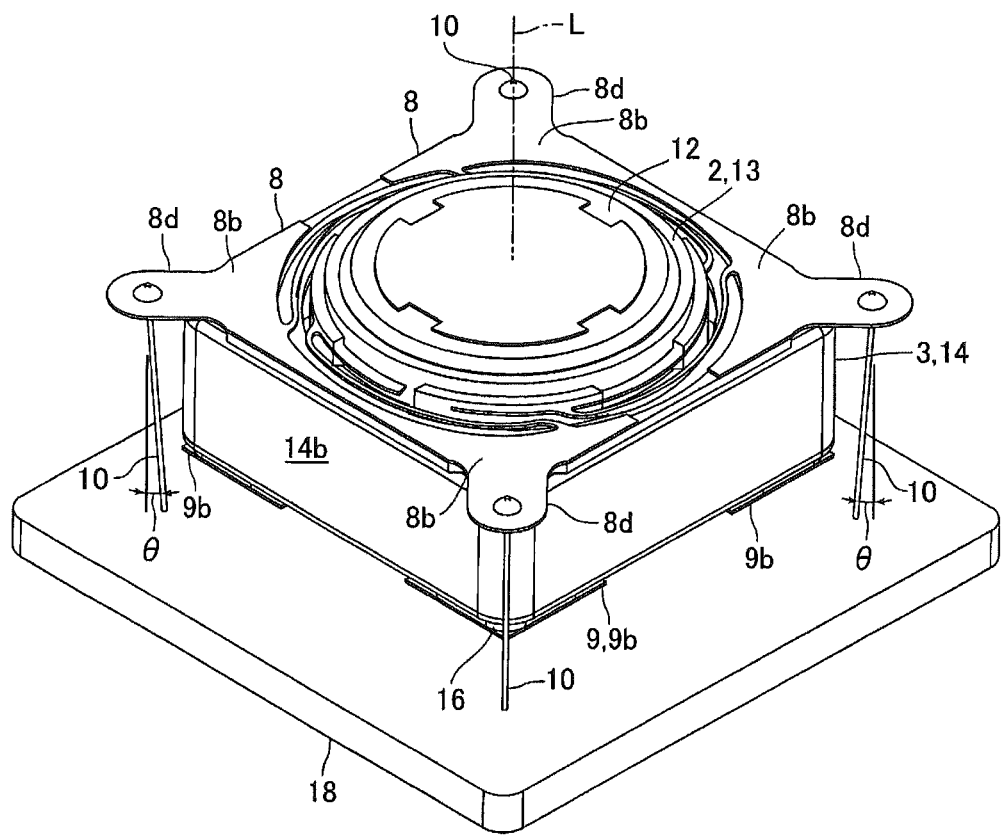
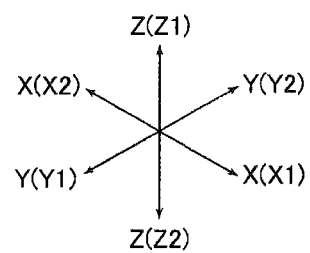

Z(Z1)
↕
Z(Z2)

LENS DRIVE DEVICE

CROSS REFERENCE TO RELATED APPLICATIONS

This is a U.S. national stage of International Application No. PCT/JP2010/072607, filed on Dec. 16, 2010. Priority under 35 U.S.C. §119(a) and 35 U.S.C. §365(b) is claimed from Japanese Application No. 2009-293732, filed Dec. 25, 2009, the disclosures of which is also incorporated herein by reference.

TECHNICAL FIELD

The present invention relates to a lens drive device which is used in a relatively small camera that is mounted on a cellular phone or the like.

BACKGROUND

Conventionally, a lens drive device for driving a photographing lens of a camera which is mounted on a cellular phone or the like has been known that includes a movable lens body, which holds a plurality of lenses and is movable in an optical axis direction, and a fixed body which movably holds the movable lens body through two plate springs (see, for example, Patent Literature 1). In the lens drive device described in Patent Literature 1, a drive coil is wound around an outer peripheral face of a cylindrical tube-like sleeve which structures the movable lens body. Further, in the lens drive device, four magnets are disposed so as to face an outer peripheral face of the drive coil.

[PTL 1] Japanese Patent Laid-Open No. 2008-58659

When a camera which is mounted on a portable device such as a cellular phone is used for photographing, a shake is easily occurred. On the other hand, in recent years, in a market of a camera which is mounted on a cellular phone or the like, requirement for a high functional camera is increased and thus a camera which is capable of correcting a shake at the time of photographing is required in the market.

SUMMARY

In view of the problem described above, at least an embodiment of the present invention provides a structure of the lens drive device which is capable of driving a lens in the optical axis direction and correcting a shake.

In order to solve the problem, at least an embodiment of the present invention provides a lens drive device including a first holding body which holds a lens and is movable in an optical axis direction of the lens, a second holding body which holds the first holding body so that the first holding body is movable in the optical axis direction, a fixed body which holds the second holding body so that the second holding body is movable in a direction substantially perpendicular to the optical axis direction, a first drive mechanism for driving the first holding body in the optical axis direction, a second drive mechanism for driving the second holding body in a predetermined first direction substantially perpendicular to the optical axis direction, a third drive mechanism for driving the second holding body in a second direction substantially perpendicular to the optical axis direction and the first direction, an elastic member having a fixed part which is fixed to the second holding body and a deformable part which is capable of being elastically deformed in the optical axis direction, and plural wires in a substantially straight line shape whose one end side is fixed to the deformable part and whose other end side is fixed to the fixed body. The second holding body is supported by the fixed body so as to be movable in a direction substantially perpendicular to the optical axis direction through the plural wires. In addition, the plural wires are inclined with respect to the optical axis direction so that the one end sides of the plural wires are widened with respect to the other end sides of the plural wires when viewed in the direction substantially perpendicular to the optical axis direction, and the deformable part is elastically deformed in the optical axis direction by a force smaller than a buckling load of the wire.

In the lens drive device in accordance with at least an embodiment of the present invention, the first holding body which holds a lens is held by the second holding body so as to be movable in the optical axis direction and the second holding body is held by the fixed body so as to be movable in a direction substantially perpendicular to the optical axis direction. Further, the lens drive device in accordance with at least an embodiment of the present invention includes a first drive mechanism for driving the first holding body in the optical axis direction, a second drive mechanism for driving the second holding body in a predetermined first direction substantially perpendicular to the optical axis direction, and a third drive mechanism for driving the second holding body in a second direction substantially perpendicular to the optical axis direction and the first direction. Therefore, the lens is capable of being moved in the optical axis direction together with the first holding body by the first drive mechanism. In other words, in at least an embodiment of the present invention, a focus adjusting operation can be performed by using the first drive mechanism. Further, the lens can be driven in a direction substantially perpendicular to the optical axis direction together with the first holding body and the second holding body by the second drive mechanism and the third drive mechanism. Therefore, in at least an embodiment of the present invention, correction of displacement for a photographing image due to a shake in the direction substantially perpendicular to the optical axis direction is performed by driving the lens in the direction substantially perpendicular to the optical axis direction and, as a result, a shake can be corrected when photographing is performed by a camera on which the lens drive device is mounted.

Further, in at least an embodiment of the present invention, the first holding body is held by the second holding body so as to be movable in the optical axis direction and the second holding body is held by the fixed body so as to be movable in the direction substantially perpendicular to the optical axis direction. Therefore, even when the second drive mechanism and/or the third drive mechanism and the first drive mechanism are simultaneously operated, the first holding body is capable of being relatively moved only in the optical axis direction with respect to the second holding body and the second holding body is capable of being relatively moved only in the direction substantially perpendicular to the optical axis direction with respect to the fixed body. Therefore, according to at least an embodiment of the present invention, inclinations of the first holding body and the second holding body can be restrained when a shake is corrected. In other words, in at least an embodiment of the present invention, inclination of the optical axis of the lens can be restrained when a shake is corrected.

In addition, in at least an embodiment of the present invention, the second holding body is supported by the fixed body through the wires so as to be movable in the direction substantially perpendicular to the optical axis direction.

Therefore, the second holding body can be smoothly moved in the direction substantially perpendicular to the optical axis direction by utilizing elastic forces of the wires and the second holding body can be returned to a predetermined reference position.

In at least an embodiment of the present invention, the second holding body is supported by the fixed body through the wires so as to be movable in the direction substantially perpendicular to the optical axis direction and thus the wires are hard to be deformed in the optical axis direction. Therefore, in at least an embodiment of the present invention, the inclination of the optical axis of the lens when the second holding body is moved in the direction substantially perpendicular to the optical axis direction (in other words, when a shake is corrected) can be restrained. On the other hand, since the wire is hard to be deformed in the optical axis direction, when an impact in the optical axis direction is applied to the lens drive device due to dropping or the like, the wire is easy to be buckled. However, the lens drive device in at least an embodiment of the present invention includes an elastic member having a fixed part which is fixed to the second holding body and a deformable part which is capable of being elastically deformed in the optical axis direction and one end side of the wire is fixed to the deformable part. Further, the deformable part is elastically deformed in the optical axis direction by a force smaller than a buckling load of the wire. Therefore, even when an impact in the optical axis direction is applied to the lens drive device due to dropping or the like, the deformable part is elastically deformed in the optical axis direction and thereby buckling of the wire can be prevented. Accordingly, the impact resistance of the lens drive device can be enhanced.

On the other hand, since the deformable part to which one end side of the wire is fixed is elastically deformed in the optical axis direction by a force smaller than a buckling load of the wire, when the second holding body fixed to the fixed part is moved in the direction substantially perpendicular to the optical axis direction, the deformable part may be elastically deformed in the optical axis direction to cause the second holding body to be inclined largely. In other words, when a shake is corrected, the deformable part may be elastically deformed in the optical axis direction to cause the optical axis of the lens to be inclined largely. However, in the lens drive device in accordance with at least an embodiment of the present invention, plural wires are inclined with respect to the optical axis direction so that one end sides of the wires are widened with respect to the other end sides of the wires when viewed in the direction substantially perpendicular to the optical axis direction. Therefore, even when the deformable part is elastically deformed in the optical axis direction at the time of correcting a shake, the inclination of the second holding body can be restrained. As a result, in at least an embodiment of the present invention, the inclination of the optical axis of the lens when a shake is corrected can be restrained while enhancing the impact resistance of the lens drive device.

In at least an embodiment of the present invention, it is preferable that the deformable part is disposed at four positions at a pitch of substantially 90° with a center of the second holding body as a substantial center and the plural wires are inclined with respect to the optical axis direction so that the other end sides of the plural wires are directed toward a center axis of the second holding body which is substantially parallel to the optical axis direction. Further, in at least an embodiment of the present invention, it is preferable that the one end sides of the plural wires are fixed to the deformable parts at a substantially equal distance from the center of the second holding body when viewed in the optical axis direction. Further, in at least an embodiment of the present invention, it is preferable that inclinations of the plural wires with respect to the optical axis direction when viewed in the first direction are substantially equal to inclinations of the plural wires with respect to the optical axis direction when viewed in the second direction. According to these structures, the inclination of the second holding body when a shake is corrected can be restrained effectively.

In at least an embodiment of the present invention, it is preferable that the lens drive device is provided with four wires and each of the four deformable parts is fixed with one wire. According to this structure, the second holding body can be supported in a well balanced manner by a minimum number of wires. Therefore, the inclination of the second holding body can be restrained effectively when a shake is corrected while the structure of the lens drive device is simplified.

Further, in this case, it is preferable that four wires are disposed so that two wires are superposed on each other when viewed in the first direction and two wires are superposed on each other when viewed in the second direction. According to this structure, the inclination of the second holding body when the second holding body is moved in the first direction and/or the second direction can be restrained further effectively.

In at least an embodiment of the present invention, the elastic member is, for example, a plate spring which is disposed so that its thickness direction is the optical axis direction. Further, in at least an embodiment of the present invention, the lens drive device is, for example, provided with a connecting plate spring which connects the first holding body with the second holding body, and the plate spring and the connecting plate spring are integrally formed with each other. In this case, the number of part items of the lens drive device can be reduced and thus the structure of the lens drive device can be simplified. Further, handling of the elastic member when the lens drive device is to be assembled is easy.

In at least an embodiment of the present invention, it is preferable that the elastic member is disposed on one end side of the second holding body in the optical axis direction, and a center of a drive force of the second drive mechanism and a center of a drive force of the third drive mechanism in the optical axis direction are located on the one end side of the second holding body in the optical axis direction with respect to the center of the second holding body in the optical axis direction. According to this structure, in comparison with a case that the center of the drive force of the second drive mechanism and the center of the drive force of the third drive mechanism in the optical axis direction are located on the other end side in the optical axis direction with respect to the center of the second holding body in the optical axis direction, the inclination of the second holding body can be restrained effectively when a shake is corrected.

In at least an embodiment of the present invention, it is preferable that the lens drive device includes an abutting member for preventing buckling of the wire which is abutted with the second holding body when the deformable part is elastically deformed in the optical axis direction and the abutting member is formed or fixed to the fixed body. According to this structure, buckling of the wire can be prevented surely by the deformable part and the abutting member. Further, according to this structure, in comparison with a case that a member corresponding to the abutting member is formed or fixed to the second holding body, the weight of a movable portion of the lens drive device is reduced. Therefore, responsiveness of the lens when a shake is corrected is enhanced.

Further, in order to solve the problem, at least an embodiment of the present invention provides a lens drive device including a first holding body which holds a lens and is movable in an optical axis direction of the lens, a second holding body which holds the first holding body so that the first holding body is movable in the optical axis direction, a fixed body which holds the second holding body so that the second holding body is movable in a direction substantially perpendicular to the optical axis direction, a first drive mechanism for driving the first holding body in the optical axis direction, a second drive mechanism for driving the second holding body in a predetermined first direction substantially perpendicular to the optical axis direction, a third drive mechanism for driving the second holding body in a second direction substantially perpendicular to the optical axis direction and the first direction, an elastic member having a fixed part which is fixed to the fixed body and a deformable part which is capable of being elastically deformed in the optical axis direction, and plural wires in a substantially straight line shape whose one end side is fixed to the deformable part and whose other end side is fixed to the second holding body. The second holding body is supported by the fixed body so as to be movable in a direction substantially perpendicular to the optical axis direction through the plural wires. In addition, the plural wires are inclined with respect to the optical axis direction so that the one end sides of the plural wires are widened with respect to the other end sides of the plural wires when viewed in the direction substantially perpendicular to the optical axis direction, and the deformable part is elastically deformed in the optical axis direction by a force smaller than a buckling load of the wire.

In the lens drive device in accordance with at least an embodiment of the present invention, the first holding body which holds a lens is held by the second holding body so as to be movable in the optical axis direction and the second holding body is held by the fixed body so as to be movable in a direction substantially perpendicular to the optical axis direction. Further, the lens drive device in accordance with at least an embodiment of the present invention includes a first drive mechanism for driving the first holding body in the optical axis direction, a second drive mechanism for driving the second holding body in a predetermined first direction substantially perpendicular to the optical axis direction, and a third drive mechanism for driving the second holding body in a second direction substantially perpendicular to the optical axis direction and the first direction. Therefore, as described above, in at least an embodiment of the present invention, a focus adjusting operation can be performed by using the first drive mechanism. Further, as described above, in at least an embodiment of the present invention, displacement for a photographing image due to a shake in the direction substantially perpendicular to the optical axis direction can be corrected by driving the lens in the direction substantially perpendicular to the optical axis direction and, as a result, a shake can be corrected when photographing is performed by a camera on which the lens drive device is mounted.

Further, in at least an embodiment of the present invention, the first holding body is held by the second holding body so as to be movable in the optical axis direction and the second holding body is held by the fixed body so as to be movable in a direction substantially perpendicular to the optical axis direction. Therefore, as described above, in at least an embodiment of the present invention, inclinations of the first holding body and the second holding body when a shake is corrected can be restrained and the inclination of the optical axis of the lens when a shake is corrected can be restrained.

In addition, in at least an embodiment of the present invention, the second holding body is supported by the fixed body through the wires so as to be movable in the direction substantially perpendicular to the optical axis direction. Therefore, the second holding body can be smoothly moved in the direction substantially perpendicular to the optical axis direction by utilizing elastic forces of the wires and the second holding body can be returned to a predetermined reference position.

In at least an embodiment of the present invention, the second holding body is supported by the fixed body through the wires so as to be movable in the direction substantially perpendicular to the optical axis direction and thus, as described above, in at least an embodiment of the present invention, the inclination of the optical axis of the lens when a shake is corrected can be restrained. On the other hand, when an impact in the optical axis direction is applied to the lens drive device due to dropping or the like, the wire is easy to be buckled. However, the lens drive device in at least an embodiment of the present invention includes an elastic member having a fixed part which is fixed to the fixed body and a deformable part which is capable of being elastically deformed in the optical axis direction and one end side of the wire is fixed to the deformable part. Further, the deformable part is elastically deformed in the optical axis direction by a force smaller than a buckling load of the wire. Therefore, even when an impact in the optical axis direction is applied to the lens drive device due to dropping or the like, the deformable part is elastically deformed in the optical axis direction and thereby buckling of the wire can be prevented. Accordingly, the impact resistance of the lens drive device can be enhanced.

On the other hand, since the deformable part to which one end side of the wire is fixed is elastically deformed in the optical axis direction by a force smaller than a buckling load of the wire, when the second holding body fixed to the other end side is moved in the direction substantially perpendicular to the optical axis direction, the deformable part may be elastically deformed in the optical axis direction to cause the second holding body to be inclined largely. In other words, when a shake is corrected, the deformable part may be elastically deformed in the optical axis direction to cause the optical axis of the lens to be inclined largely. However, in the lens drive device in accordance with at least an embodiment of the present invention, plural wires are inclined with respect to the optical axis direction so that one end sides of the wires are widened with respect to the other end sides of the wires when viewed in the direction substantially perpendicular to the optical axis direction. Therefore, even when the deformable part is elastically deformed in optical axis direction at the time of correcting a shake, the inclination of the second holding body can be restrained. As a result, in at least an embodiment of the present invention, the inclination of the optical axis of the lens when a shake is corrected can be restrained while enhancing the impact resistance of the lens drive device.

As described above, in the lens drive device in accordance with at least an embodiment of the present invention, the lens can be driven in the optical axis direction and, in addition, a shake can be corrected. Further, in at least an embodiment of the present invention, the inclination of the optical axis of the lens when a shake is corrected can be restrained while enhancing the impact resistance of the lens drive device. In addition, in at least an embodiment of the present invention, the second holding body can be moved smoothly and the second holding body can be returned to a predetermined reference position.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is a perspective view showing a lens drive device in accordance with an embodiment of the present invention.

FIG. 3 is a plan view for explaining a structure of the lens drive device shown in FIG. 1.

FIG. 5 is a perspective view showing a state that a first holding body and a second holding body shown in FIG. 2 are supported by a base plate.

DESCRIPTION OF EMBODIMENTS

Embodiments of the present invention will be described below with reference to the accompanying drawings.
(Schematic Structure of Lens Drive Device)

Figure 2:
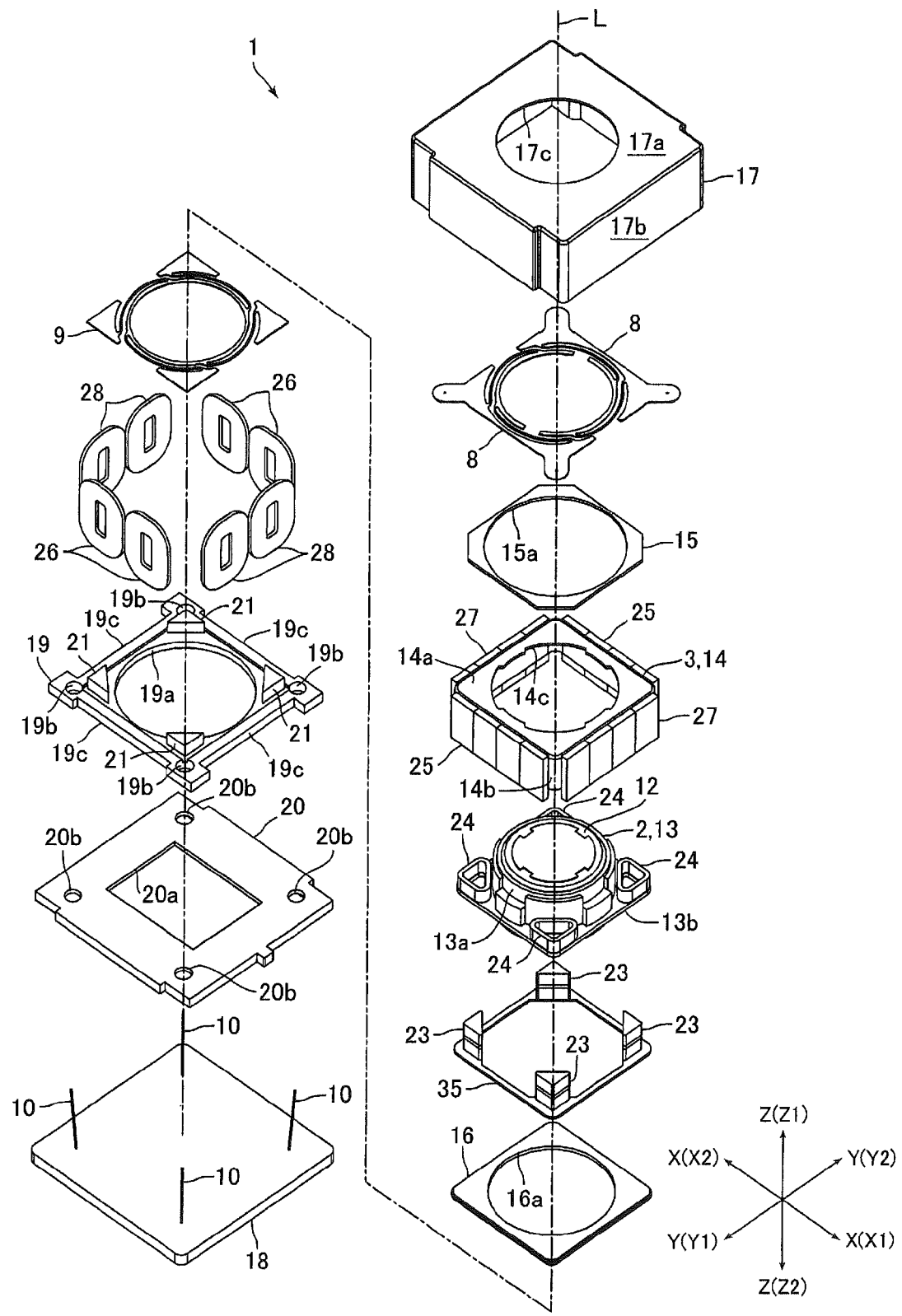
FIG. 2 is an exploded perspective view showing the lens drive device in FIG. 1.
Figure 4:
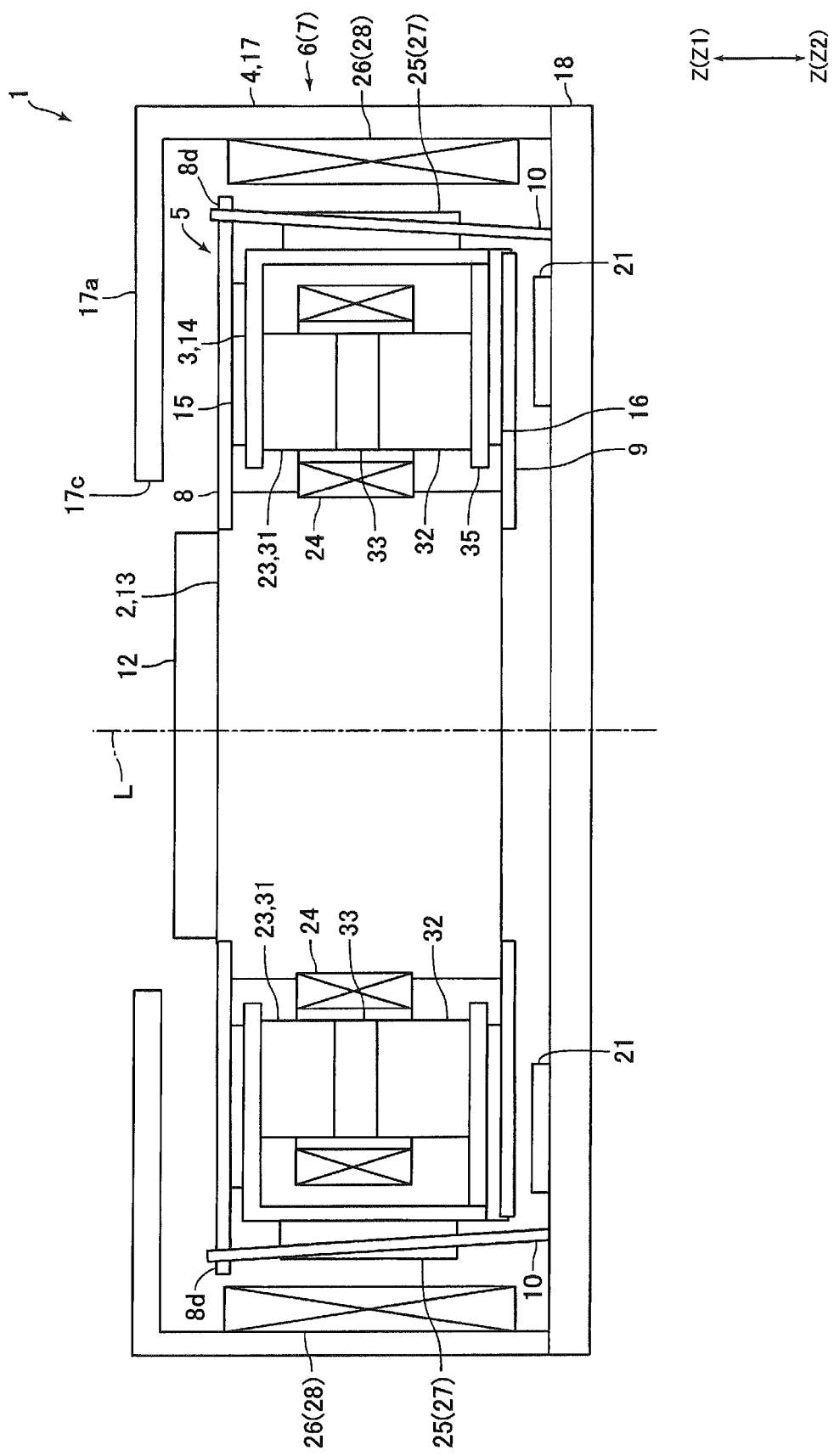
FIG. 4 is a schematic side view for explaining a schematic structure of the lens drive device shown in FIG. 1.
Figure 6:
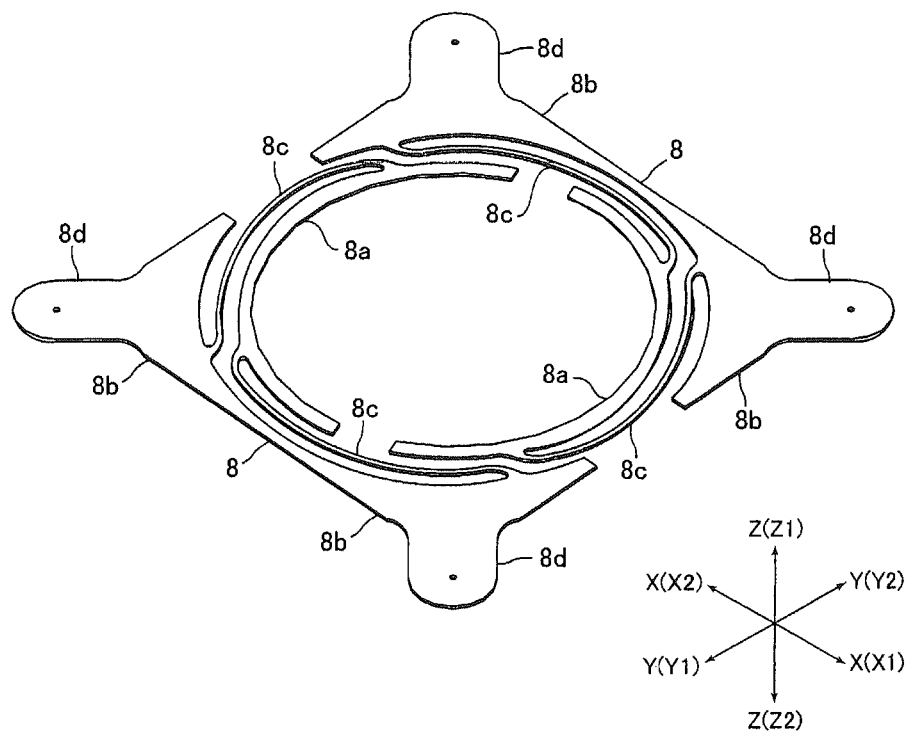
FIG. 6 is a perspective view showing a plate spring in FIG. 2.
Figure 7:
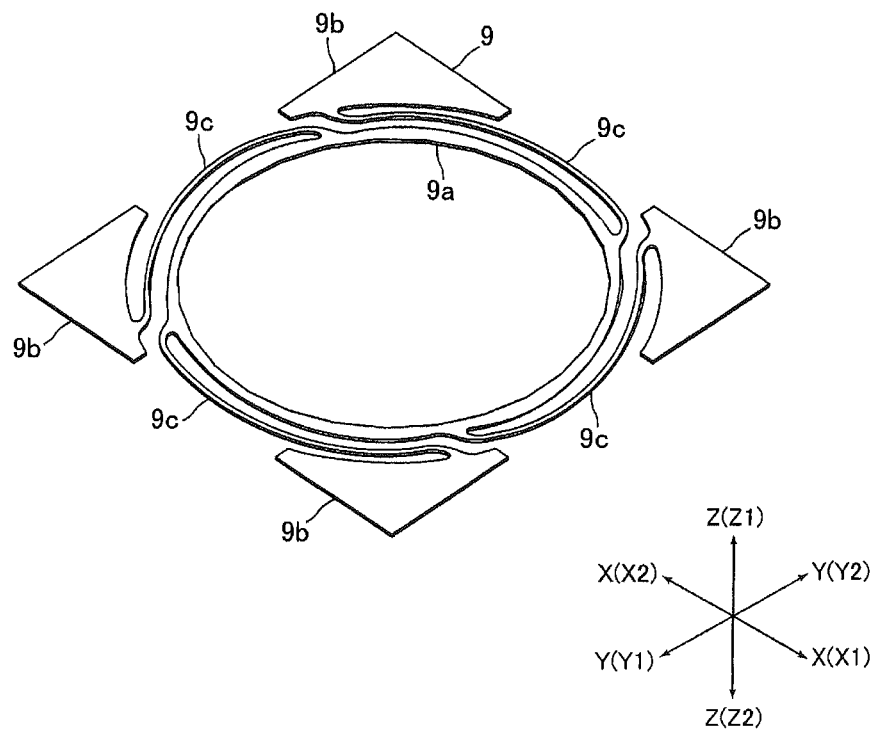
FIG. 7 is a perspective view showing a plate spring in FIG. 2.

FIG. 1 is a perspective view showing a lens drive device 1 in accordance with an embodiment of the present invention. FIG. 2 is an exploded perspective view showing the lens drive device 1 in FIG. 1. FIG. 3 is a plan view for explaining a structure of the lens drive device 1 shown in FIG. 1. FIG. 4 is a schematic side view for explaining a schematic structure of the lens drive device 1 shown in FIG. 1. FIG. 5 is a perspective view showing a state that a first holding body 2 and a second holding body 3 shown in FIG. 2 are supported by a base plate 18. FIG. 6 is a perspective view showing a plate spring 8 in FIG. 2. FIG. 7 is a perspective view showing a plate spring 9 in FIG. 2. In FIG. 3, a plan view of the lens drive device 1 is shown in which a plate spring 8, a lens holder 12, a spacer 15, a cover member 17 and a bottom part 14a of a magnet fixing member 14 shown in FIG. 2 are detached. Further, in FIG. 4, a coil fixing member 19, a protection member 20 and the like are not shown.

In the following description, as shown in FIG. 1 and the like, three directions perpendicular to each other are set to be an "X" direction, a "Y" direction and a "Z" direction. Further, an "X1" direction side in FIG. 1 and the like is referred to as a "right" side, an "X2" direction side is referred to as a "left" side, a "Y1" direction side is referred to as a "front" side, a "Y2" direction side is referred to as a "rear" side, a "Z1" direction side is as an "upper" side, and a "Z2" direction side is as a "lower" side. Further, a plane which is formed by the "Y" direction and the "Z" direction is referred to as a "YZ" plane and a plane which is formed by the "Z" direction and the "X" direction is referred to as a "ZX" plane.

A lens drive device 1 in this embodiment is mounted on a relatively small camera which is used in a cellular phone, a drive recorder, a monitor camera system or the like. The lens drive device 1 is, as shown in FIG. 1, formed in a substantially rectangular prism shape as a whole. Specifically, the lens drive device 1 is formed in a substantially square shape when viewed in a direction of an optical axis "L" of a lens for photography (optical axis direction). Further, in this embodiment, four side faces of the lens drive device 1 are substantially parallel to the "YZ" plane or the "ZX" plane.

The lens drive device 1 includes, as shown in FIGS. 1 through 5, a first holding body 2 which holds a lens for photography and is movable in the optical axis direction, a second holding body 3 which holds the first holding body 2 so that the first holding body 2 is movable in the optical axis direction, a fixed body 4 which holds the second holding body 3 so that the second holding body 3 is movable in a direction substantially perpendicular to the optical axis direction, a first drive mechanism 5 for driving the first holding body 2 in the optical axis direction, a second drive mechanism 6 for driving the second holding body 3 in a right and left direction, and a third drive mechanism 7 for driving the second holding body 3 in a front and rear direction.

Further, the lens drive device 1 includes plate springs 8 and 9 for connecting the first holding body 2 with the second holding body 3 and plural wires 10 for connecting the second holding body 3 with the fixed body 4. In other words, in this embodiment, the first holding body 2 is movably supported in the optical axis direction by the second holding body 3 through the plate springs 8 and 9 and the second holding body 3 is movably supported in the direction substantially perpendicular to the optical axis direction by the fixed body 4 through the plural wires 10.

In this embodiment, the "Z" direction (upper and lower direction) is coincided with the optical axis direction. Further, in this embodiment, the "X" direction (right and left direction) is a first direction which is substantially perpendicular to the optical axis direction and the "Y" direction (front and rear direction) is a second direction which is substantially perpendicular to the optical axis direction and the first direction. Further, in this embodiment, an imaging element is disposed on a lower portion ("Z2" direction side) of the lens drive device 1 and an object to be photographed which is disposed on an upper side ("Z1" direction side) is photographed. In other words, in this embodiment, an upper side is an object to be photographed side (object side) and a lower side is an opposite-to-object side (imaging element side, image side).

The first holding body 2 includes a sleeve 13 which holds a lens holder 12 to which a lens for photography is fixed. The second holding body 3 includes a magnet fixing member 14 to which a first drive magnet 23, a second drive magnet 25 and a third drive magnet 27 described below are fixed, a spacer 15 which is fixed to the magnet fixing member 14 and to which a part of the plate spring 8 is fixed, and a spacer 16 which is fixed to the magnet fixing member 14 and to which a part of the plate spring 9 is fixed. The fixed body 4 includes a cover member 17 which structures front and rear and right and left side faces of the lens drive device 1, a base plate 18 structuring an under face of the lens drive device 1, a coil fixing member 19 to which a second drive coil 26 and a third drive coil 28 described below are fixed, and a protection member 20 which protects the imaging element.

The lens holder 12 is, for example, formed of nonmagnetic resin material. Further, the lens holder 12 is formed in a substantially cylindrical tube shape. A lens for photography is fixed to an inner peripheral side of the lens holder 12.

The sleeve 13 is, for example, formed of nonmagnetic resin material. Further, the sleeve 13 is provided with a tube part 13a which is formed in a roughly cylindrical tube shape and a flange part 13b which is formed so as to extend from a lower end side of the tube part 13a to an outer side in a radial direction of the tube part 13a.

The tube part 13a holds the lens holder 12 on its inner peripheral side. In other words, an outer peripheral face of the lens holder 12 is fixed to an inner peripheral face of the tube part 13a. The flange part 13b is formed in a substantially square shape when viewed in the upper and lower direction and the shape of the first holding body 2 when viewed in the upper and lower direction is a substantially square shape. Further, an outer peripheral end of the flange part 13b when viewed in the upper and lower direction is substantially parallel to the right and left direction or the front and rear direction. The first drive coil 24 described below is fixed to four corners of an upper face of the flange part 13b. Further, an arrangement hole 13c to which the first drive magnet 23 described below is disposed is formed at four corners of the flange part 13b so as to penetrate through in the upper and lower direction (see FIG. 3).

The magnet fixing member 14 is formed of magnetic material. For example, the magnet fixing member 14 is formed of metal material having a magnetic property. Further, the magnet fixing member 14 is formed in a substantially rectangular bottomed tube shape having a bottom part 14a and a tube part 14b. Specifically, the magnet fixing member 14 is formed in a substantially rectangular bottomed tube shape whose shape when viewed in the upper and lower direction is a substantially square shape and the shape of the second holding body 3 when viewed in the upper and lower direction is a substantially square shape. A center of the bottom part 14a which is disposed on the upper side is formed with a through hole 14c penetrating through in the upper and lower direction and an upper end side of the first holding body 2 is disposed in the through hole 14c. Further, four side faces structuring the tube part 14b are substantially parallel to the "YZ" plane or the "ZX" plane. The magnet fixing member 14 is disposed so as to surround outer peripheral sides of the first holding body 2 and the first drive mechanism 5 and is disposed on an inner side of the cover member 17.

The spacers 15 and 16 are, for example, formed of resin material having an insulation property. Further, the spacers 15 and 16 are formed in a substantially square-like thin plate. Outer peripheral ends of the spacers 15 and 16 when viewed in the upper and lower direction are substantially parallel to the right and left direction or the front and rear direction. Centers of the spacers 15 and 16 are formed with through holes 15a and 16a penetrating through in the upper and lower direction. An upper end side of the first holding body 2 is disposed in the through hole 15a and a lower end side of the first holding body 2 is disposed in the through hole 16a.

The spacer 15 is fixed to an upper face of the bottom part 14a of the magnet fixing member 14. Further, a second fixing part 8b described below which structures the plate spring 8 is fixed to an upper face of the spacer 15. The spacer 16 is fixed to a lower end of the tube part 14b of the magnet fixing member 14. Further, a second fixing part 9b described below which structures the plate spring 9 is fixed to an under face of the spacer 16.

The cover member 17 is, for example, formed of nonmagnetic metal material such as a stainless-steel plate. Further, the cover member 17 is formed in a substantially rectangular bottomed tube shape having a bottom part 17a and a tube part 17b. Specifically, the cover member 17 is formed in a substantially rectangular bottomed tube shape whose shape when viewed in the upper and lower direction is a substantially square shape. A center of the bottom part 17a disposed on the upper side is formed with a through hole 17c penetrating through in the upper and lower direction. Further, four side faces structuring the tube part 17b are substantially parallel to the "YZ" plane or the "ZX" plane. The cover member 17 is disposed so as to surround outer peripheral sides of the first holding body 2, the second holding body 3, the first drive mechanism 5, the second drive mechanism 6 and the third drive mechanism 7.

The base plate 18 is a circuit board which is formed in a substantially square-shaped plate. The base plate 18 is mainly formed of nonmagnetic material such as epoxy glass (glass epoxy). An outer peripheral end of the base plate 18 when viewed in the upper and lower direction is substantially parallel to the right and left direction or the front and rear direction. An imaging element not shown is mounted on a center of the base plate 18. Further, the base plate 18 is mounted with a sensor such as a gyroscope (angular velocity sensor) for detecting change of inclination of the lens drive device 1 and a drive circuit, a control circuit for driving and controlling the first drive mechanism 5, the second drive mechanism 6 and the third drive mechanism 7, and the like. In addition, the base plate 18 is formed with circuit patterns for power supply for supplying an electric current to the first drive coil 24, the second drive coil 26 and the third drive coil 28 described below.

The coil fixing member 19 is, for example, formed of nonmagnetic resin material. Further, the coil fixing member 19 is formed in a roughly square-shaped plate and an outer peripheral end of the coil fixing member 19 when viewed in the upper and lower direction is substantially parallel to the right and left direction or the front and rear direction. A center of the coil fixing member 19 is formed with a through hole 19a penetrating through in the upper and lower direction. Further, an insertion hole 19b into which a wire 10 is inserted is formed at four corners of the coil fixing member 19 so as to penetrate through in the upper and lower direction. Further, recessed parts 19c for fixing lower end sides of the second drive coils 26 and the third drive coils 28 described below are formed at outer peripheral end of the coil fixing member 19 so as to be recessed toward inner sides in the right and left direction and toward inner sides in the front and rear direction.

An upper face of the coil fixing member 19 is fixed with an abutting member 21 which is structured to be abutted with an under face of the second holding body 3 when the wire fixing part 8d described below structuring the plate spring 8 is deformed to the lower direction (see FIG. 2). In this embodiment, the abutting member 21 is fixed at each of four positions in the vicinities of the four corners of the coil fixing member 19 (in other words, at four positions in the vicinities of the four corners of the coil fixing member 19).

The abutting member 21 is, for example, formed of nonmagnetic resin material. Further, the abutting member 21 is, for example, formed in a substantially triangular prism-like shape and is fixed to the coil fixing member 19 so as to protrude upward from an upper face of the coil fixing member 19. In accordance with an embodiment of the present invention, the abutting member 21 may be integrally formed with the coil fixing member 19. In other words, the coil fixing part may be formed on the upper face at positions near the four corners of the coil fixing member 19 so as to protrude to the upper side.

The protection member 20 is, for example, formed of nonmagnetic resin material. Further, the protection member 20 is formed in a substantially square plate shape and an outer peripheral end of the protection member 20 when viewed in the upper and lower direction is substantially parallel to the right and left direction or the front and rear direction. A center of the protection member 20 is formed with a through hole 20a penetrating through in the upper and lower direction and the imaging element mounted on the base plate 18 is disposed in the through hole 20a. Further, an insertion hole 20b through which the wire 10 is passed is formed at four corners of the protection member 20 so as to penetrate through in the upper and lower direction. The protection member 20 is fixed on a lower end side of the cover member 17. Further, the coil fixing member 19 is fixed on the upper face of the protection member 20 and the base plate 18 is fixed to an under face of the protection member 20.

In this embodiment, when viewed in the upper and lower direction, a center (mechanical gravity center) of the first holding body 2 is substantially coincided with the optical axis "L", a center (mechanical gravity center) of the second holding body 3 is substantially coincided with the optical axis "L", and a center (mechanical gravity center) of the fixed body 4 is substantially coincided with the optical axis "L". In other words, in this embodiment, a center (mechanical gravity center) of the lens drive device 1 is substantially coincided with the optical axis "L" when viewed in the upper and lower direction.

The plate springs 8 and 9 are formed of elastic material. Further, the plate springs 8 and 9 are formed of electrically conductive material. For example, the plate springs 8 and 9 are formed of metal material having elasticity and electro-conductivity. The plate springs 8 and 9 are disposed so that their thickness directions are substantially parallel to the upper and lower direction. In this embodiment, two plate springs 8 are disposed on the upper end side of the sleeve 13 and one plate spring 9 is disposed on the lower end side of the sleeve 13. Further, in this embodiment, the spring constants of the plate springs 8 and 9 in a direction substantially perpendicular to the upper and lower direction are set to be larger than the spring constants of the plate springs 8 and 9 in the upper and lower direction.

The plate spring 8 is, as shown in FIG. 6, provided with a first fixing part 8a which is fixed to an upper end of the sleeve 13, two second fixing parts 8b which are fixed to an upper face of the spacer 15, two arm parts 8c which connect the first fixing part 8a with the second fixing part 8b, and two wire fixing parts 8d to which an upper end of the wire 10 is fixed. Further, an external shape of the plate springs 8 are formed in a roughly square shape when two plate springs 8 are attached to the sleeve 13 and the like. Further, an outer peripheral end of the roughly square shape formed by two plate springs 8 when viewed in the upper and lower direction is substantially parallel to the right and left direction or the front and rear direction.

The first fixing part 8a is formed in a substantially semicircular arc shape. The second fixing part 8b is formed in a roughly triangular shape and is disposed at four corners of a roughly square shape formed by two plate springs 8. In other words, the first fixing part 8a is disposed on an inner side in a radial direction with respect to the second fixing part 8b. The arm part 8c acts as a spring part which supports the first holding body 2. The arm part 8c is formed in a substantially ¼ circular arc shape so as to obtain a predetermined spring force.

The wire fixing part 8d is formed so as to protrude toward an outer side in the radial direction from the second fixing part 8b. Specifically, the wire fixing part 8d is formed so as to protrude from the second fixing part 8b in a direction inclined by substantially 45° with respect to the right and left direction and the front and rear direction. In other words, the wire fixing part 8d is disposed at four positions at the pitch of substantially 90° with the center of the second holding body 3 (in other words, optical axis "L") as a substantial center.

Further, the wire fixing part 8d is formed so that its shape when viewed in the upper and lower direction is a substantially semi-elliptic shape. In other words, when viewed in the upper and lower direction, the wire fixing part 8d is protruded from the second fixing part 8b with a substantially constant width toward the direction inclined by a substantially 45° with respect to the right and left direction and the front and rear direction and an end part of the wire fixing part 8d is formed in a semicircular shape. The wire fixing part 8d is formed with an insertion hole into which an upper end of the wire 10 is inserted so as to penetrate through in the upper and lower direction.

In this embodiment, the second fixing part 8b is a fixing part which is fixed to the second holding body 3 and the wire fixing part 8d is a deformable part which is capable of being elastically deformed in the optical axis direction. Further, in this embodiment, the second fixing part 8b which is a fixing part and the wire fixing part 8d which is a deformable part structure an elastic member. In addition, in this embodiment, a connecting plate spring which connects the first holding body 2 with the second holding body 3 is structured of the first fixing part 8a, the second fixing parts 8b and the arm parts 8c.

The plate spring 9 is, as shown in FIG. 7, provided with a first fixing part 9a which is fixed to a lower end of the sleeve 13, four pieces of second fixing part 9b which are fixed to an under face of the spacer 16, and four arm parts 9c which connect the first fixing part 9a with the second fixing part 9b. Further, the plate spring 9 is formed so that its external shape is a substantially square shape and an outer peripheral end of the plate spring 9 when viewed in the upper and lower direction is substantially parallel to the right and left direction or the front and rear direction.

The first fixing part 9a is formed in a substantially circular shape. The second fixing part 9b is formed in a substantially triangular shape and is disposed at four corners of the plate spring 9. The arm part 9c acts as a spring part which supports the first holding body 2. The arm part 9c is formed in a substantially ¼ circular arc shape so as to obtain a predetermined spring force.

The wire 10 is formed of elastic material. Further, the wire 10 is formed of electrically conductive material. For example, the wire 10 is formed of metal material having elasticity and electro-conductivity. Further, the wire 10 is formed in a long and thin and substantially cylindrical straight shape. In accordance with an embodiment of the present invention, the wire 10 may be formed in a long and thin and substantially polygonal pillar shape such as a substantially rectangular pillar shape or may be formed in a long and thin and substantially elliptic pillar shape.

As shown in FIG. 5, a lower end of the wire 10 is fixed to the base plate 18. The upper end of the wire 10 is fixed to and electrically connected with the wire fixing part 8d of the plate spring 8. Specifically, each of four wire fixing parts 8d is fixed with the upper end of one wire 10 and the upper ends of two wires 10 are fixed to and electrically connected with the one piece of the plate spring 8. Further, the lower end of one of the two wires 10 which are fixed to the one piece of the plate spring 8 is electrically connected with a circuit pattern for power supply which is formed on the base plate 18.

In this embodiment, as shown in FIG. 5, the wire 10 is disposed at each of positions in the vicinities of the four corners of the second holding body 3 when viewed in the upper and lower direction, and the second holding body 3 is supported by the fixed body 4 through four wires 10. Further, in this embodiment, the four wires 10 are disposed at 90° rotationally symmetrical positions with the center of the second holding body 3 as a substantial center (in other words, the optical axis "L" as a substantial center) when viewed in the optical axis direction.

Further, in this embodiment, as shown in FIG. 4, when viewed in a direction substantially perpendicular to the upper and lower direction, the wires 10 are inclined with respect to the upper and lower direction so that the upper end sides of the wires 10 are widened with respect to the lower end sides of the wires 10. Specifically, the wire 10 is gradually inclined with respect to the upper and lower direction so that the lower end side of the wire 10 is directed to the center axis of the second holding body 3 (in other words, optical axis "L") which is substantially parallel to the upper and lower direction (optical axis direction).

Further, when viewed in the upper and lower direction, the upper end sides of four wires 10 are fixed to the wire fixing parts 8d at a substantially equal distance from the center of the second holding body 3 and the lower end sides of four wires 10 are fixed to the base plate 18 at a substantially equal distance from the center of the second holding body 3. In addition, in this embodiment, the inclination with respect to the upper and lower direction of the wire 10 when viewed in the right and left direction is substantially equal to the inclination of the wire 10 with respect to the upper and lower direction when viewed in the front and rear direction. For example, an inclination angle "θ" (see FIG. 5) with respect to the upper and lower direction when viewed in a direction, which is substantially perpendicular to the upper and lower direction and is inclined by substantially 45° with respect to the right and left direction and the front and rear direction, is set to be not more than about 30°. Specifically, the inclination angle "θ" is about 14°. Further, in this embodiment, the four wires 10 are disposed so that two wires 10 are superposed on each other when viewed in the right and left direction and two wires 10 are superposed on each other when viewed in the front and rear direction.

An end part on the winding start side and an end part on the winding end side of the first drive coil 24 described below are fixed and electrically connected with each of the two plate springs 8. Further, one of the two wires 10 fixed to the plate spring 8 and the plate spring 8 perform a power supply function for supplying an electric current to the first drive coil 24 from the base plate 18.

The first drive mechanism 5 includes first drive magnets 23 formed in a substantially triangular prism shape and first drive coils 24 which are formed so as to be wound around in a substantially triangular tube-like shape. The second drive mechanism 6 includes second drive magnets 25 formed in a substantially rectangular flat plate shape and second drive coils 26 which are formed so as to be wound around in a substantially rectangular flat plate shape. The third drive mechanism 7 includes third drive magnets 27 formed in a substantially rectangular flat plate shape and third drive coils 28 which are formed so as to be wound around in a substantially rectangular flat plate shape. Next, the structures of the first drive mechanism 5, the second drive mechanism 6 and the third drive mechanism 7 will be described below.

(Structures of First Drive Mechanism, Second Drive Mechanism and Third Drive Mechanism)

Figure 8:
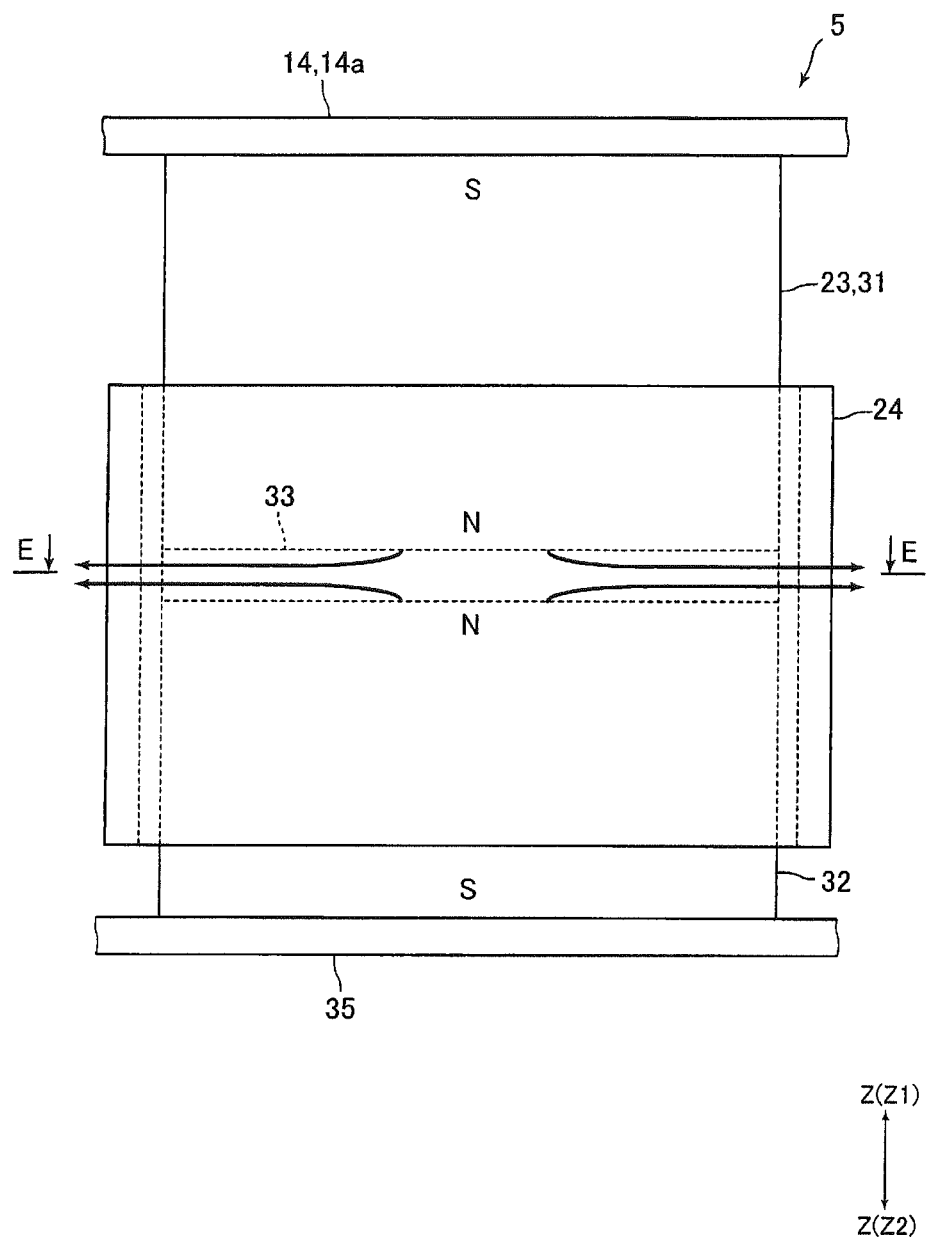
FIG. 8 is a side view showing a first drive magnet and a first drive coil shown in FIG. 2.
Figure 9:
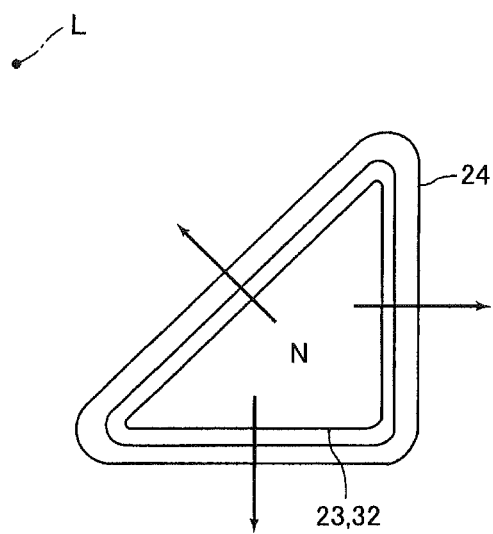
FIG. 9 is a view showing a first drive magnet piece and the first drive coil which are viewed in the "E-E" direction in FIG. 8.
Figure 10:
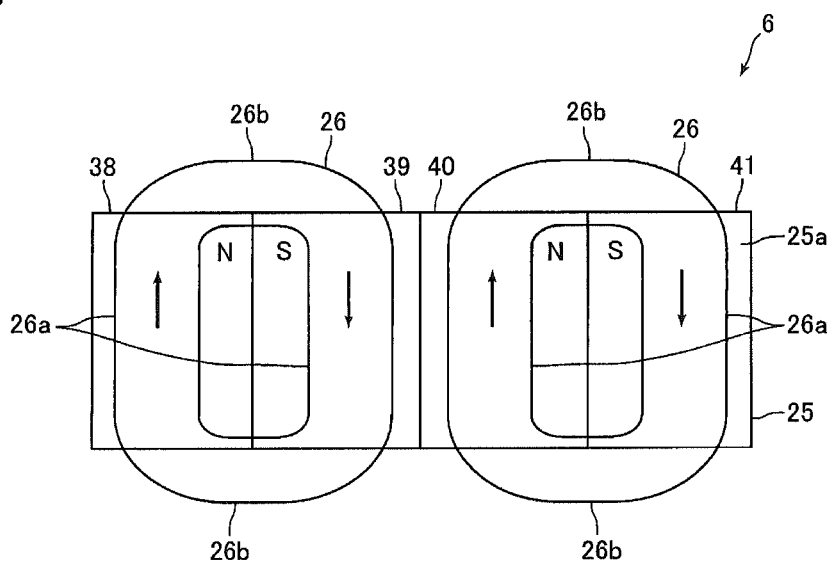
FIG. 10 is an explanatory view showing a facing relationship of a second drive magnet to a second drive coil which is viewed in the "F-F" direction in FIG. 3.

FIG. 8 is a side view showing the first drive magnet 23 and the first drive coil 24 shown in FIG. 2. FIG. 9 is a view showing a first drive magnet piece 32 and the first drive coil 24 which are viewed in the "E-E" direction in FIG. 8. FIG. 10 is an explanatory view showing a facing relationship of the second drive magnet 25 to the second drive coils 26 which is viewed in the "F-F" direction in FIG. 3.

As described above, the first drive mechanism 5 includes the first drive magnets 23 and the first drive coils 24.

The first drive magnet 23 is, as described above, formed in a substantially triangular prism shape and is disposed on an inner peripheral side of the tube part 14b of the magnet fixing member 14 so that its longitudinal direction is substantially parallel to the upper and lower direction. The first drive coil 24 is, as described above, formed in a substantially triangular tube-like shape and is disposed so that its inner peripheral face is oppositely disposed to an outer peripheral face of the first drive magnet 23 through a predetermined gap space. In this embodiment, as shown in FIG. 3, the first drive magnet 23 and the first drive coil 24 are disposed at each of the four corners of the first holding body 2 and the second holding body 3 when viewed in the upper and lower direction.

The first drive magnet 23 includes, as shown in FIG. 8, two first drive magnet pieces 31 and 32 which are formed in a substantially triangular prism shape and are disposed so as to superpose on each other in the upper and lower direction and a magnetic plate 33 having a substantially triangular shape which is disposed between the first drive magnet pieces 31 and 32. In this embodiment, the first drive magnet piece 31 is disposed on an upper side and the first drive magnet piece 32 is disposed on a lower side. Further, a lower end face of the first drive magnet piece 31 and an upper end face of the magnetic plate 33 are fixed to each other and an upper end face of the first drive magnet piece 32 and a lower end face of the magnetic plate 33 are fixed to each other.

The first drive magnet pieces 31 and 32 are formed so that their shapes when viewed in the upper and lower direction are a substantially rectangular equilateral triangle. The first drive magnet pieces 31 and 32 are disposed so that, when viewed in the upper and lower direction, two sides except the oblique side are substantially parallel to an inner peripheral face of the tube part 14b of the magnet fixing member 14. The magnetic plate 33 is formed of magnetic material. The magnetic plate 33 is formed in a flat plate shape so that its shape when viewed in the upper and lower direction is a substantially rectangular equilateral triangle which is similar to the first drive magnet pieces 31 and 32.

An upper end face of the first drive magnet piece 31 is fixed to an under face of the bottom part 14a of the magnet fixing member 14 and the upper end face of the first drive magnet piece 31 is abutted with the under face of the bottom part 14a. A lower end face of the first drive magnet piece 32 is fixed to a magnetic member 35 which is formed of magnetic material in a flat plate shape and the lower end face of the first drive magnet piece 32 is abutted with an upper face of the magnetic member 35. The magnetic member 35 is formed in a substantially square frame shape so that four first drive magnet pieces 32 are fixed (see FIG. 2). The under face of the magnetic member 35 is fixed to an upper face of the spacer 16. Further, an outer peripheral end of the magnetic member 35 when viewed in the upper and lower direction is substantially paralleled to the right and left direction or the front and rear direction and the outer peripheral end of the magnetic member 35 is abutted with the inner peripheral face of the tube part 14b of the magnet fixing member 14. In this embodiment, the magnet fixing member 14 and the magnetic member 35 function as a yoke for the first drive magnet 23.

The first drive coil 24 is, as shown in FIGS. 3 and 9, wound around so that its shape when viewed in the upper and lower direction is a substantially rectangular equilateral triangle. The first drive coil 24 is fixed at four corners of the upper face of the flange part 13b of the sleeve 13. Specifically, the first drive coil 24 is fixed to the upper face of the flange part 13b so that an inner peripheral face of the first drive coil 24 and the outer peripheral face of the first drive magnet 23 are substantially parallel to each other through a predetermined gap space, and the first drive coil 24 is disposed on the inner side of the tube part 14b of the magnet fixing member 14. A predetermined gap space is formed between the first drive coil 24 and the tube part 14b and thus the first drive coil 24 is movable in the upper and lower direction together with the sleeve 13 with respect to the second holding body 3.

In this embodiment, four first drive coils 24 are formed by using one conducting wire wound around successively. Further, an end part on a winding start side of the first drive coil 24 is fixed to and electrically connected with the first fixing part 8a of one of the two plate springs 8 and an end part on a winding end side of the first drive coil 24 is fixed to and electrically connected with the first fixing part 8a of the other of the two plate springs 8.

As shown in FIG. 8, two first drive magnet pieces 31 and 32 which structure the first drive magnet 23 are disposed so that the same magnetic poles ("S"-pole and "S"-pole, or "N"-pole and "N"-pole) are faced each other in the upper and lower direction. In other words, the opposing faces of the first drive magnet pieces 31 and 32 are magnetized to be the same magnetic pole. For example, both of the opposing faces of the first drive magnet pieces 31 and 32 are magnetized to be an "N"-pole. Therefore, as shown by the arrows in FIGS. 8 and 9, a magnetic flux passing through the entire periphery of the first drive coil 24 is generated between the first drive magnet pieces 31 and 32.

The second drive mechanism 6 includes, as described above, the second drive magnets 25 and the second drive coils 26.

The second drive magnet 25 is, as described above, formed in a substantially rectangular flat plate shape and is disposed on an outer peripheral side of the tube part 14b of the magnet fixing member 14 so that its thickness direction is substantially parallel to the front and rear direction. Further, the second drive magnet 25 is disposed on the outer peripheral side of the tube part 14b so that its longitudinal direction is substantially parallel to the right and left direction and its short side direction is substantially parallel to the upper and lower direction. The second drive coil 26 is, as described above, formed in a roughly rectangular flat plate shape and is disposed on an outer side of the second drive magnet 25 in the front and rear direction so that its thickness direction is substantially parallel to the front and rear direction and the second drive coil 26 is oppositely disposed to the second drive magnet 25 through a predetermined gap space in the front and rear direction.

In this embodiment, one second drive magnet 25 and two second drive coils 26 are oppositely disposed to each other on both sides of the magnet fixing member 14 in the front and rear direction. Further, the second drive magnet 25 and the second drive coils 26 are oppositely disposed to each other so that the center of the drive force of the second drive mechanism 6 in the optical axis direction is located on an upper side in the optical axis direction with respect to the center of the second holding body 3. In other words, when viewed in the direction substantially perpendicular to the optical axis direction, the second drive magnet 25 and the second drive coils 26 are oppositely disposed to each other so that the center of the drive force of the second drive mechanism 6 is located on an upper side with respect to the center of the second holding body 3.

The second drive magnet 25 is fixed to each of a front side face and a rear side face of the tube part 14b of the magnet fixing member 14 and an inner side face of the second drive magnet 25 in the front and rear direction is abutted with a front side face or a rear side face of the tube part 14b. In this embodiment, the magnet fixing member 14 functions as a yoke for the second drive magnet 25.

Further, the second drive magnet 25 is, as shown in FIG. 10, structured of four second drive magnet pieces 38 through 41. The second drive magnet pieces 38 through 41 are formed in a substantially rectangular thin plate shape and are fixed in an abutted state in this order in the right and left direction. Further, the second drive magnet pieces 38 through 41 are magnetized so that an "N"-pole and an "S"-pole are alternately disposed on an opposing face 25a of the second drive magnet 25 to the second drive coil 26.

The second drive coil 26 is wound around in a roughly rectangular shape as described above and is an air-core coil which is structured of two long side parts 26a substantially parallel to each other and two short side parts 26b shorter than the long side part 26a and substantially parallel to each other (see FIG. 10). A lower end of the second drive coil 26 is fixed to the coil fixing member 19 so that the long side part 26a is substantially parallel to the upper and lower direction.

Further, two second drive coils 26 are adjacently disposed to each other in the right and left direction so as to face the second drive magnet 25 which is fixed to the front side face of the magnet fixing member 14, and two second drive coils 26 are adjacently disposed to each other in the right and left direction so as to face the second drive magnet 25 which is fixed to the rear side face of the magnet fixing member 14. Winding directions of the two second drive coils 26 which are adjacently disposed to each other in the right and left direction are the same as each other. Further, in this embodiment, for example, two second drive coils 26 disposed on the front face side of the magnet fixing member 14 and two second drive coils 26 disposed on the rear face side of the magnet fixing member 14 are formed by using one conducting wire which is wound around successively.

In this embodiment, as shown in FIG. 10, the second drive magnet 25 and the second drive coils 26 are formed and disposed so that each of four magnetic poles of the opposing face 25a of the second drive magnet 25 faces each of four long side parts 26a juxtaposed in the right and left direction.

The third drive mechanism 7 includes, as described above, the third drive magnets 27 and the third drive coils 28.

The third drive magnet 27 is, as described above, formed in a substantially rectangular flat plate shape and is disposed on an outer peripheral side of the tube part 14b of the magnet fixing member 14 so that its thickness direction is substantially parallel to the right and left direction. Further, the third drive magnet 27 is disposed on the outer peripheral side of the tube part 14b so that its longitudinal direction is substantially parallel to the front and rear direction and its short side direction is substantially parallel to the upper and lower direction. The third drive coil 28 is, as described above, formed in a roughly rectangular flat plate shape and is disposed on an outer side of the third drive magnet 27 in the right and left direction so that its thickness direction is substantially parallel to the right and left direction and the third drive coil 26 is oppositely disposed to the third drive magnet 27 through a predetermined gap space in the right and left direction.

In this embodiment, one third drive magnet 27 and two third drive coils 28 are oppositely disposed to each other on both sides of the magnet fixing member 14 in the right and left direction. Further, the third drive magnet 27 and the third drive coils 28 are oppositely disposed to each other so that the center of the drive force of the third drive mechanism 7 in the optical axis direction is located on an upper side in the optical axis direction with respect to the center of the second holding body 3. In other words, when viewed in the direction substantially perpendicular to the optical axis direction, the third drive magnet 27 and the third drive coils 28 are oppositely disposed to each other so that the center of the drive force of the third drive mechanism 7 is located on an upper side with respect to the center of the second holding body 3.

The third drive magnet 27 is fixed to each of a right side face and a left side face of the tube part 14b of the magnet fixing member 14 and an inner side face of the third drive magnet 27 in the right and left direction is abutted with a right side face or a left side face of the tube part 14b. In this embodiment, the magnet fixing member 14 functions as a yoke for the third drive magnet 27.

Further, the third drive magnet 27 is, similarly to the second drive magnet 25, structured of four second drive magnet pieces 38 through 41. In the third drive magnet 27, the second drive magnet pieces 38 through 41 are fixed in an abutted state in this order in the front and rear direction. An opposing face 27a of the third drive magnet 27 to the third drive coil 28 is, similarly to the opposing face 25a of the second drive magnet 25, magnetized in four poles so that an "N"-pole and an "S"-pole are alternately disposed.

The third drive coil 28 is an air-core coil whose shape is similar to the second drive coil 26 and is structured of two long side parts 28a substantially parallel to each other and two short side parts shorter than the long side part 28a and substantially parallel to each other. A lower end of the third drive coil 28 is, similarly to the second drive coil 26, fixed to the coil fixing member 19 so that the long side parts 28a are substantially parallel to the upper and lower direction.

Further, two third drive coils 28 are adjacently disposed to each other in the front and rear direction so as to face the third drive magnet 27 which is fixed to the right side face of the magnet fixing member 14, and two third drive coils 28 are adjacently disposed to each other in the front and rear direction so as to face the third drive magnet 27 which is fixed to the left side face of the magnet fixing member 14. Winding directions of the two third drive coils 28 which are adjacently disposed to each other in the front and rear direction are the same as each other. Further, in this embodiment, for example, two third drive coils 28 disposed on the right face side of the magnet fixing member 14 and two third drive coils 28 disposed on the left face side of the magnet fixing member 14 are formed by using one conducting wire which is wound around successively.

In this embodiment, similarly to the second drive magnet 25 and the second drive coil 26, the third drive magnet 27 and the third drive coils 28 are formed and disposed so that each of four magnetic poles of the opposing face 27a of the third drive magnet 27 faces each of four long side parts 28a juxtaposed in the front and rear direction.

(Operations of Wire Fixing Part and Abutting Member)

Figure 11:
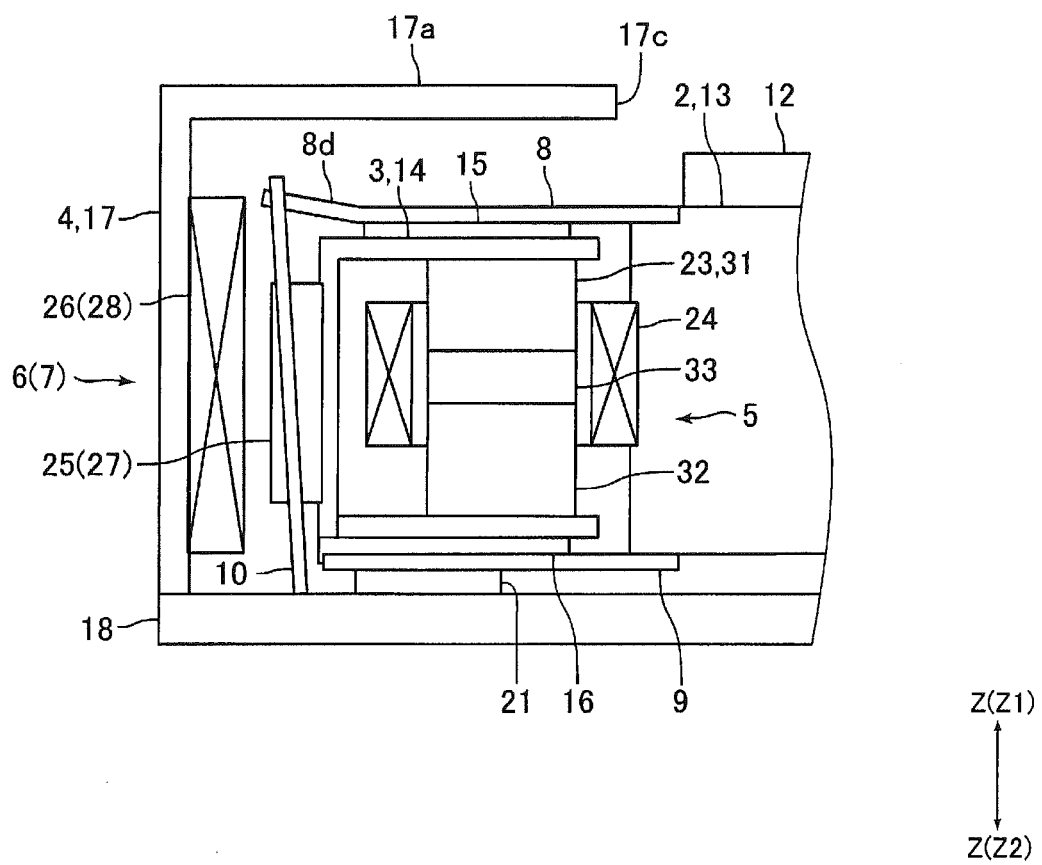
FIG. 11 is an explanatory view showing operations of a wire fixing part of a plate spring and an abutting member shown in FIG. 2.

FIG. 11 is a view for explaining operations of the wire fixing part 8d of the plate spring 8 and the abutting member 21 shown in FIG. 2.

As described above, in this embodiment, the wire 10 is disposed so that its inclination angle "θ" with respect to the upper and lower direction is not more than about 30°. Therefore, the wire 10 is hardly deformed in the upper and lower direction. Further, a diameter of the wire 10 in this embodiment is very small. Therefore, when a force is applied to the wire 10 in the lower direction, the wire 10 is easily buckled. Accordingly, in this embodiment, buckling of the wire 10 is prevented by the wire fixing part 8d and the abutting member 21.

Specifically, a width and thickness of the wire fixing part 8d are set so that, when a force in the upper and lower direction is applied to a movable portion such as the second holding body 3 or the like, the wire fixing part 8d is elastically deformed in the upper and lower direction by a force smaller than the buckling load of the wire 10 with a boundary part between the second fixing part 8b and the wire fixing part 8d as a supporting point. Therefore, when a force in the lower direction is applied to the movable portion such as the second holding body 3 or the like, the wire fixing part 8d is elastically deformed in the upper direction by a force smaller than the buckling load of the wire 10. Further, the abutting member 21 is disposed at a position so that, when the wire fixing part 8d is deformed to the upper direction, the abutting member 21 is abutted with an under face side of the second holding body 3 before the wire 10 is buckled. For example, the abutting member 21 is disposed at a position so as to be capable of abutting with the under face of the second fixing part 9b of the plate spring 9 which is fixed to the under face of the spacer 16 structuring the second holding body 3.

Therefore, when a force in a lower direction is applied to a movable portion of the second holding body 3 or the like, the wire fixing part 8d is elastically deformed in the upper direction as shown in FIG. 11 before the wire 10 is buckled.

Further, when the wire fixing part 8*d* is elastically deformed in the upper direction, before the wire 10 is buckled, the upper face of the abutting member 21 is abutted with the under face of the second holding body 3 and thus movement of the second holding body 3 in the lower direction is restricted. In this embodiment, buckling of the wire 10 is prevented by operations of the wire fixing part 8*d* and the abutting member 21.

(Schematic Operation of Lens Drive Device)

In the lens drive device 1 structured as described above, when photographing is to be performed with a camera on which the lens drive device 1 is mounted, an electric current is supplied to the first drive coil 24 to move the first holding body 2 in the optical axis direction and focus adjustment of the lens is executed. Further, when a shake of the camera is detected by the gyroscope mounted on the base plate 18, an electric current is supplied to the second drive coil 26 and/or the third drive coil 28 based on the detection result of the sensor and the second holding body 3 is moved together with the first holding body 2 in the front and rear direction and/or the right and left direction to correct the shake.

For example, in this embodiment, supply amounts of electric currents to the second drive coil 26 and the third drive coil 28 are controlled by open control in which electric currents required to correct a shake by moving the second holding body 3 in the right and left direction and/or the front and rear direction are supplied to the second drive coil 26 and the third drive coil 28 based on a shake amount of the camera detected by the gyroscope.

In accordance with an embodiment of the present invention, when the lens drive device 1 includes a position sensor such as a Hall element for detecting a position of the second holding body 3 in the front and rear direction and the right and left direction, feedback control (closed control) may be executed in which, while monitoring a detection result of the position sensor, electric currents required to correct a shake are supplied to the second drive coil 26 and the third drive coil 28.

(Principal Effects in this Embodiment)

As described above, in this embodiment, the first holding body 2 which holds a lens for photography is held by the second holding body 3 so as to be movable in the optical axis direction and the second holding body 3 is held by the fixed body 4 so as to be movable in the front and rear direction and the right and left direction (front, rear, right and left directions). Therefore, the lens can be moved in the optical axis direction together with the first holding body 2 by the first drive mechanism 5. In other words, in this embodiment, an operation of focus adjustment is executed by using the first drive mechanism 5. Further, the lens can be driven together with the first holding body 2 and the second holding body 3 in the front, rear, right and left directions by the second drive mechanism 6 and the third drive mechanism 7. Therefore, in this embodiment, the lens is driven in the front, rear, right and left directions and thereby displacement of a photographing image due to a shake in a direction substantially perpendicular to the optical axis direction can be corrected and, as a result, a shake can be corrected when photographing is performed with a camera on which the lens drive device 1 is mounted.

In this embodiment, the first holding body 2 is movably supported in the optical axis direction by the second holding body 3 through the plate springs 8 and 9 and the second holding body 3 is movably supported in the front, rear, right and left directions by the fixed body 4 through the wires 10. Therefore, the first holding body 2 can be smoothly moved in the optical axis direction and, in addition, the first holding body 2 can be returned to a predetermined reference position by utilizing elastic forces of the plate springs 8 and 9. Further, the second holding body 3 can be smoothly moved in the front, rear, right and left directions by utilizing the elastic forces of the wires 10 and, in addition, the second holding body 3 can be returned to a predetermined reference position.

Further, in this embodiment, the first holding body 2 is held by the second holding body 3 so as to be movable in the optical axis direction and the second holding body 3 is held by the fixed body 4 so as to be movable in the front, rear, right and left directions. Therefore, even when the second drive mechanism 6 and/or the third drive mechanism 7 and the first drive mechanism 5 are acted simultaneously, the first holding body 2 is relatively moved only in the optical axis direction with respect to the second holding body 3 and the second holding body 3 is relatively moved only in the front, rear, right and left directions with respect to the fixed body 4. Therefore, in this embodiment, when a shake is corrected, inclinations of the first holding body 2 and the second holding body 3 with respect to the upper and lower direction can be restrained. In other words, in this embodiment, when a shake is corrected, an inclination of the optical axis "L" of the lens can be restrained. Especially, in this embodiment, the wire 10 is disposed so that its inclination angle "θ" with respect to the optical axis direction is not more than about 30° and thus the wire 10 is hardly deformed in the optical axis direction. Therefore, when the second holding body 3 is moved in the front, rear, right and left directions, the inclination of the optical axis "L" of the lens can be restrained effectively. In other words, in this embodiment, when a shake is corrected, inclination of the optical axis "L" of the lens can be restrained effectively.

In this embodiment, when a force in the lower direction is applied to the movable portion such as the second holding body 3 or the like, the wire fixing part 8*d* is elastically deformed in the upper direction by a force smaller than the buckling load of the wire 10. Therefore, even when an impact is applied to the lens drive device 1 in the optical axis direction due to dropping or the like, the wire fixing part 8*d* is elastically deformed in the upper direction and thereby the buckling of the wire can be prevented. Especially, in this embodiment, when the wire fixing part 8*d* is deformed in the upper direction, the abutting member 21 is abutted with the under face side of the second holding body 3 before the wire 10 is buckled and thus the buckling of the wire 10 is surely prevented by the wire fixing part 8*d* and the abutting member 21. Therefore, in this embodiment, impact resistance of the lens drive device 1 can be enhanced.

On the other hand, the wire fixing part 8*d* is elastically deformed in the optical axis direction by a force smaller than the buckling load of the wire 10. Therefore, when the second holding body 3 is moved in the front, rear, right and left directions for correcting a shake, the wire fixing part 8*d* is elastically deformed in the optical axis direction and thereby the second holding body 3 may be inclined. However, in this embodiment, when viewed in the direction substantially perpendicular to the optical axis direction, the wires 10 are inclined so that a distance between the upper end sides of the wires 10 is set to be wider than a distance between the lower end sides of the wires 10 (the upper end sides of the wires 10 are widened with respect to the lower end sides of the wires 10). Therefore, even when the wire fixing part 8 is elastically deformed in the optical axis direction by a force smaller than the buckling load of the wire 10, the inclination of the second holding body 3 can be restrained at the time of correcting a shake.

Figure 12A:
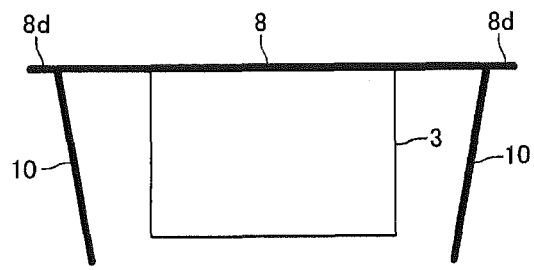
FIGS. 12(A) and 12(B) are schematic views for explaining a state when the second holding body is moved in a direction substantially perpendicular to an optical axis direction in a lens drive device shown in FIG. 1.
Figure 12B:
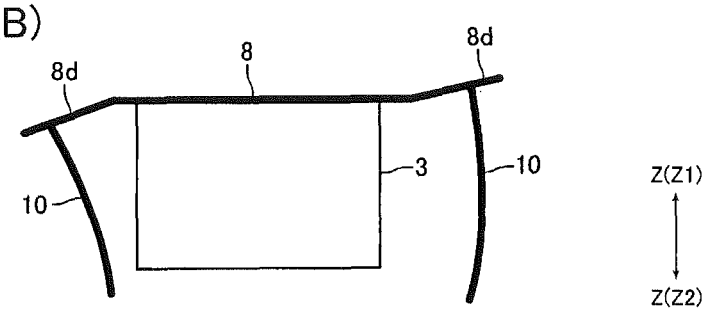

In other words, as shown in FIG. 12(A), when viewed in the direction substantially perpendicular to the optical axis direction, in a case that the wires 10 are inclined so that the upper end sides of the wires 10 are widened with respect to the lower end sides of the wires 10, even when the second holding body 3 is moved in the front, rear, right and left directions and thereby the wire fixing parts 8d are elastically deformed in the optical axis direction, the inclination of the second holding body 3 are capable of being restrained. For example, as shown in FIG. 12(B), in a case that the second holding body 3 is moved in the left direction in FIG. 12(B), the wire fixing part 8d disposed on the left side in FIG. 12(B) is elastically deformed in the lower direction and the wire fixing part 8d disposed on the right side in FIG. 12(B) is elastically deformed in the upper direction. However, the wire 10 disposed on the left side in FIG. 12(B) is elastically deformed so as to fall in the left direction and the wire 10 disposed on the right side in FIG. 12(B) is elastically deformed so as to stand up in the left direction and thus the inclination of the second holding body 3 can be restrained.

Figure 13A:
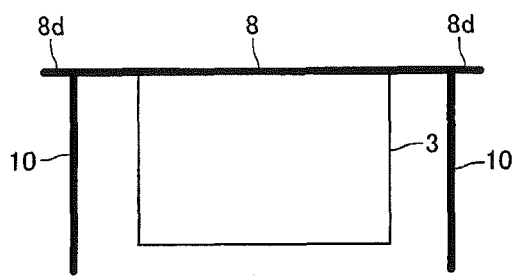
FIGS. 13(A) and 13(B) are schematic views for explaining a state when the second holding body is moved in a direction substantially perpendicular to an optical axis direction in a lens drive device including wires which are disposed substantially parallel to an optical axis direction.
Figure 13B:
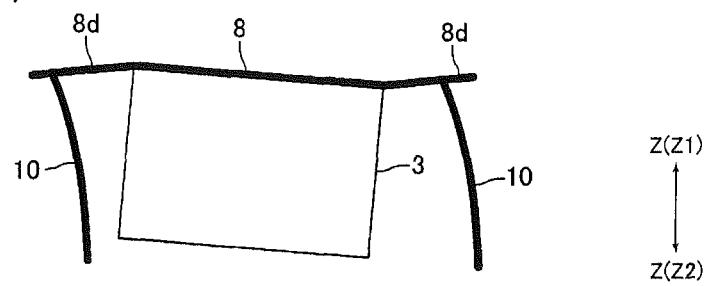

On the other hand, as shown in FIG. 13(A), in a case that the wires 10 are disposed so as to be substantially parallel to the optical axis direction, when the second holding body 3 is moved in the front, rear, right and left directions and thereby the wire fixing part 8d are elastically deformed in the optical axis direction, the second holding body 3 is easy to be inclined largely. For example, as shown in FIG. 13(B), in a case that the second holding body 3 is moved in the left direction in FIG. 13(B), the wire fixing part 8d disposed on the left side in FIG. 13(B) is elastically deformed in the lower direction and the wire fixing part 8d disposed on the right side in FIG. 13(B) is elastically deformed in the upper direction. In this case, the wires 10 disposed on the left side and the right side in FIG. 13(B) are elastically deformed so as to fall in the left direction and thus the second holding body 3 is easy to be inclined largely.

As described above, in this embodiment, when viewed in the direction substantially perpendicular to the optical axis direction, the wires 10 are inclined so that the upper end sides of the wires 10 are widened with respect to the lower end sides of the wires 10 and thus, even when the wire fixing parts 8d are elastically deformed in the optical axis direction for correcting a shake, the second holding body 3 is hard to be inclined. Therefore, in this embodiment, the inclination of the optical axis "L" of the lens when a shake is corrected is capable of being restrained while enhancing the impact resistance of the lens drive device 1.

Especially, in this embodiment, the wire fixing part 8d is disposed at four positions at the pitch of substantially 90° with the center of the optical axis "L" as a substantial center and the four wires 10 are disposed so that their lower end sides are inclined toward the optical axis "L". Further, in this embodiment, when viewed in the optical axis direction, the upper end sides of four wires 10 are fixed to the wire fixing parts 8d at a substantially equal distance from the center of the second holding body 3 and the lower end sides of four wires 10 are fixed to the base plate 18 at a substantially equal distance from the center of the second holding body 3. In addition, in this embodiment, the inclination with respect to the optical axis direction of the wire 10 when viewed in the right and left direction is substantially equal to the inclination of the wire 10 with respect to the optical axis direction when viewed in the front and rear direction. Further, in this embodiment, the four wires 10 are disposed so that two wires 10 are superposed on each other when viewed in the right and left direction and two wires 10 are superposed on each other when viewed in the front and rear direction.

Therefore, in this embodiment, the inclination of the second holding body 3 can be restrained effectively when the second holding body 3 is moved in the right and left direction and/or the front and rear direction. In other words, in this embodiment, the inclination of the optical axis "L" of the lens is capable of being effectively restrained when a shake is corrected.

Further, in this embodiment, the center of the drive force of the second drive mechanism 6 and the center of the drive force of the third drive mechanism 7 in the optical axis direction are located on an upper side with respect to the center of the second holding body 3 in the optical axis direction. Therefore, in comparison with a case that the center of the drive force of the second drive mechanism 6 and the center of the drive force of the third drive mechanism 7 in the optical axis direction are located on a lower side with respect to the center of the second holding body 3 in the optical axis direction, the inclination of the second holding body 3 can be restrained effectively when a shake is corrected.

Figure 14A:
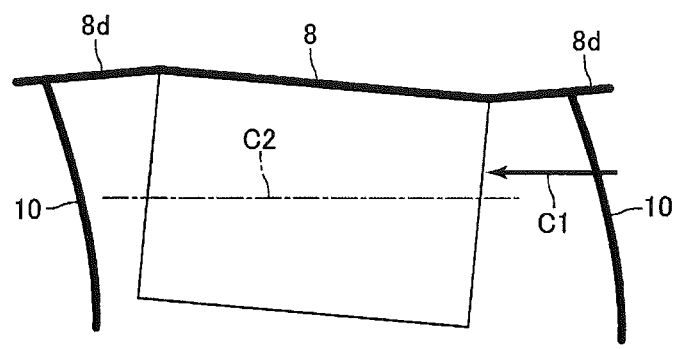
FIGS. 14(A) and 14(B) are schematic views for explaining an effect in a case that the centers of drive forces of a second drive mechanism and a third drive mechanism in an optical axis direction are located on a plate spring side with respect to the center of second holding body in an optical axis direction in the lens drive device shown in FIG. 1.
Figure 14B:
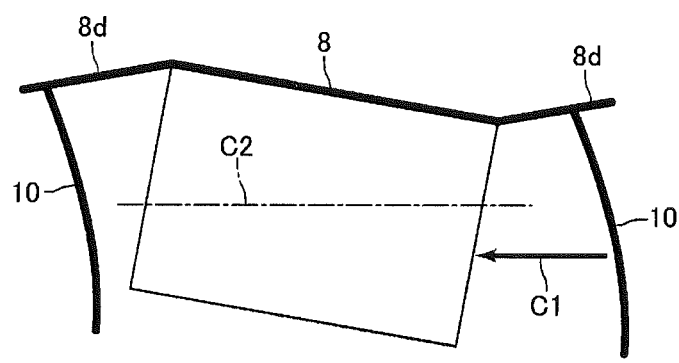

In other words, as shown in FIG. 14(B), in a case that the centers "C1" of drive forces of the second drive mechanism 6 and the third drive mechanism 7 in the optical axis direction are located on a lower side with respect to the center "C2" of the second holding body 3 in the optical axis direction, distances between the centers "C1" of the drive forces of the second drive mechanism 6 and the third drive mechanism 7 and the plate spring 8 become longer and thus the inclination of the second holding body 3 becomes larger when the second holding body 3 is moved in the front, rear, right and left directions. On the other hand, as shown in FIG. 14(A), in a case that the centers "C1" of the drive forces of the second drive mechanism 6 and the third drive mechanism 7 in the optical axis direction are located on an upper side with respect to the center "C2" of the second holding body 3 in the optical axis direction, distances between the centers "C1" of the drive forces of the second drive mechanism 6 and the third drive mechanism 7 and the plate spring 8 become shorter and thus the inclination of the second holding body 3 can be restrained when the second holding body 3 is moved in the front, rear, right and left directions.

In this embodiment, the second holding body 3 is supported by the fixed body 4 through four wires 10 which are disposed at each of the vicinities of the four corners of the second holding body 3 when viewed in the optical axis direction. Therefore, the second holding body 3 can be supported in a well balanced manner by a minimum number of wires 10. Accordingly, the inclination of the second holding body 3 can be restrained effectively when a shake is corrected while the structure of the lens drive device 1 is simplified.

In this embodiment, the wire fixing part 8d which structures the plate spring 8 functions to prevent buckling of the wire 10. Therefore, in this embodiment, in comparison with a case that a member having a function for supporting the first holding body 2 and a member having a function for preventing buckling of the wire 10 are separately provided from each other, the structure of the lens drive device 1 can be simplified and handling of components when the lens drive device 1 is to be assembled is easy.

In this embodiment, the abutting member 21 is fixed to the upper face of the coil fixing member 19. Therefore, in comparison with a case that the abutting member 21 is fixed to a lower end side of the second holding body 3, the weight of a movable portion of the lens drive device 1 is reduced. Therefore, responsiveness of the lens when a shake is corrected is enhanced.

(Relationship between Inclination Angle of Wire and Inclination of Optical Axis)

Figure 15:
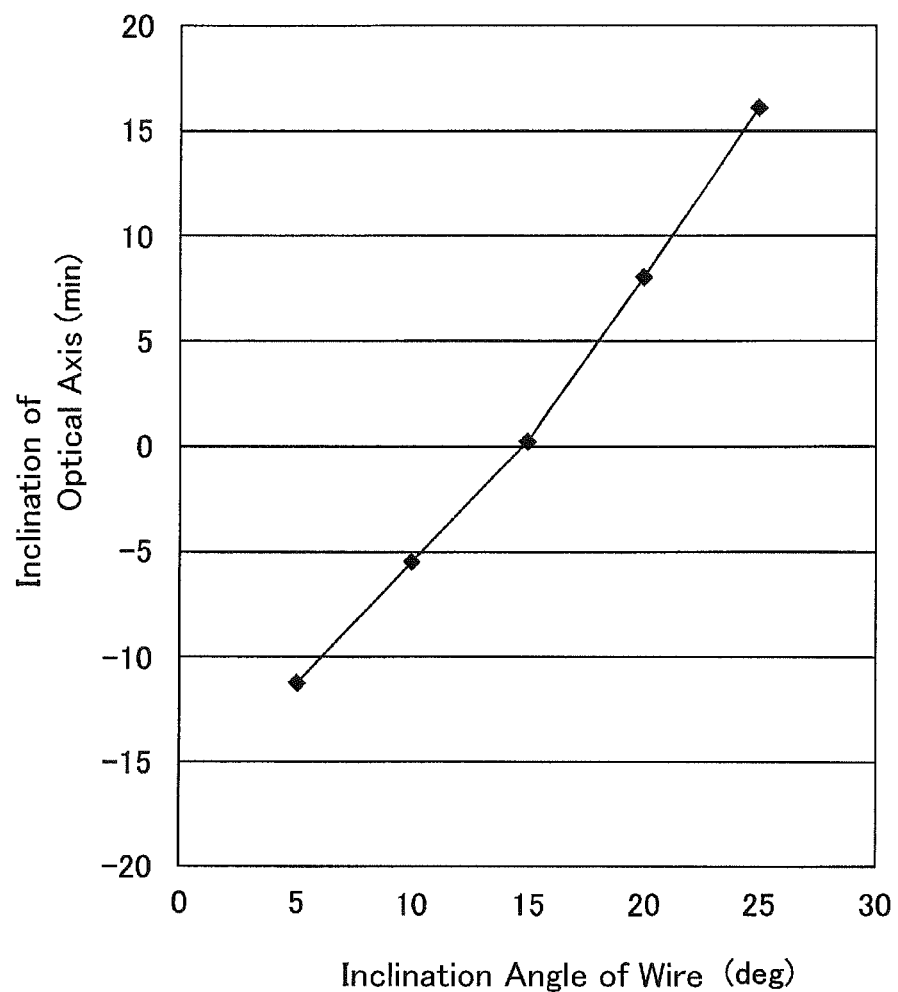
FIG. 15 is a graph showing a simulation result of a relationship between an inclination angle of a wire and an inclination of an optical axis when a second holding body is moved in a direction substantially perpendicular to the optical axis direction in the lens drive device shown in FIG. 1.

FIG. 15 is a graph showing a simulation result of a relationship between an inclination angle "θ" of the wire 10 and an inclination of the optical axis "L" when the second holding body 3 is moved in the direction substantially perpendicular to the optical axis direction in the lens drive device 1 shown in FIG. 1.

A simulation is executed with regard to a relationship between an inclination angle "θ" of the wire 10 and an inclination of the optical axis "L" when the second holding body 3 is moved in the direction substantially perpendicular to the optical axis direction in the lens drive device 1. In the simulation, a diameter of the wire 10, a length of the wire 10 and a thickness of the wire fixing part 8d are set as follows.

Diameter of the wire 10: 0.070 mm
Length of the wire 10: 2.75 mm
Thickness of the wire fixing part 8d: 0.050 mm Further, in the simulation, the shape of the plate spring 8 is set so that a spring constant of the wire fixing part 8d is 80 (gf/mm).

Under the above-mentioned conditions, the inclination of the optical axis "L" (in other words, the inclination of the second holding body 3) is calculated when the second holding body 3 is moved by 0.12 mm in the direction substantially perpendicular to the optical axis direction while the inclination angle "θ" (see FIG. 5) is changed.

As shown in FIG. 15, as a result of the simulation, in a case that the inclination angle "θ" of the wire 10 is about 14°, the inclination of the optical axis "L" is substantially eliminated when the second holding body 3 is moved by 0.12 mm in the direction substantially perpendicular to the optical axis direction. Further, in a case that the inclination angle "θ" of the wire 10 is within a range of about 6° through about 22°, the inclination of the optical axis "L" is less than 10 minutes when the second holding body 3 is moved by 0.12 mm in the direction substantially perpendicular to the optical axis direction. In other words, in a case that the inclination angle "θ" of the wire 10 is set to be in a range of 14±8°, the inclination of the optical axis "L" is restrained less than ±10 minutes when the second holding body 3 is moved by 0.12 mm in the direction substantially perpendicular to the optical axis direction.

(Other Embodiments)

Although the present invention has been shown and described with reference to a specific embodiment, various changes and modifications will be apparent to those skilled in the art from the teachings herein.

In the embodiment described above, the upper end of the wire 10 is fixed to the wire fixing part 8d and the lower end of the wire 10 is fixed to the base plate 18. However, the present invention is not limited to this embodiment. For example, it may be structured that the lens drive device 1 includes an elastic member which is provided with a fixed part fixed to the fixed body 4 such as the base plate 18 and a deformable part which is capable of being elastically deformed in the optical axis direction and the lower end of the wire 10 is fixed to the deformable part of the elastic member and the upper end of the wire 10 is fixed to the second holding body 3. In this case, for example, the elastic member is a plate spring which is formed so as to be substantially similar to the plate spring structured of the second fixed parts 8b and the wire fixed parts 8d and the base plate 18 and the lower ends of the wires 10 are connected with each other through the elastic member. Further, in this case, for example, the upper ends of the wires 10 are directly fixed to the second holding body 3. Further, in this case, when viewed in the direction substantially perpendicular to the optical axis direction, the wires 10 are inclined with respect to the optical axis direction so that the lower end sides of the wires 10 are widened with respect to the upper end sides of the wires 10. Even in this case, similar effects to the embodiment described above can be obtained. In this case, it may be structured that, similarly to the embodiment described above, the upper ends of the wires 10 are fixed to the wire fixed parts 8d.

In the embodiment described above, the second fixed part 8b of the plate spring 8 is a fixed part which is fixed to the second holding body 3 and the wire fixed part 8d of the plate spring 8 is a deformable part which is elastically deformed in the optical axis direction by a force smaller than the buckling load of the wire 10. However, the present invention is not limited to this embodiment. For example, a plate spring provided with a fixed part which is fixed to the second holding body 3 and a deformable part which is elastically deformed in the optical axis direction by a force smaller than the buckling load of the wire 10 may be formed separately from the plate spring 8. Alternatively, an elastic member provided with a fixed part which is fixed to the second holding body 3 and a deformable part which is elastically deformed in the optical axis direction by a force smaller than the buckling load of the wire 10 may be formed by using elastic material such as rubber or sponge.

In the embodiment described above, the upper end of the wire 10 is fixed to the plate spring 8 and the lower end of the wire 10 is fixed to the base plate 18. However, the present invention is not limited to this embodiment. For example, it may be structured that a lower end side of the wire 10 is fixed to the plate spring 9 and an upper end side of the wire 10 is fixed to a resin member or the like which is fixed to the bottom part 17a of the cover member 17. In this case, for example, a wire fixing part similar to the wire fixing part 8d of the plate spring 8 is formed in the plate spring 9 and a lower end side of the wire 10 is fixed to the wire fixing part. Further, in this case, for example, an abutting member for abutting with the second holding body 3 to prevent buckling of the wire 10 is fixed to the resin member or the like which is fixed to the bottom part 17a of the cover member 17. Further, in this case, when viewed in the direction substantially perpendicular to the optical axis direction, the wires 10 are inclined with respect to the optical axis direction so that the lower end sides of the wires 10 are widened with respect to the upper end sides of the wires 10.

In the embodiment described above, the center of the drive force of the second drive mechanism 6 and the center of the drive force of the third drive mechanism 7 in the optical axis direction are located on an upper side with respect to the center of the second holding body 3 in the optical axis direction. However, the present invention is not limited to this embodiment. For example, the center of the drive force of the second drive mechanism 6 and/or the center of the drive force of the third drive mechanism 7 in the optical axis direction may be substantially coincided in the optical axis direction with the center of the second holding body 3 in the optical axis direction. Further, the center of the drive force of the second drive mechanism 6 and the center of the drive force of the third drive mechanism 7 in the optical axis direction may be located on a lower side with respect to the center of the second holding body 3 in the optical axis direction.

In the embodiment described above, the first drive magnet 23, the second drive magnet 25 and the third drive magnet 27 are fixed to the magnet fixing member 14 structuring the second holding body 3. However, the present invention is not limited to this embodiment. For example, the first drive magnet 23, the second drive magnet 25 and the third drive magnet 27 may be fixed to the fixed body 4. In this case, the first drive coil 24 is fixed to the first holding body 2. Further, in this case, the second drive coil 26 and the third drive coil 28 may be fixed to the first holding body 2 or may be fixed to the second holding body 3. Further, the first drive magnet 23, the second drive magnet 25 and the third drive magnet 27 may be fixed to the first holding body 2. In this case, the second drive coil 26 and the third drive coil 28 are fixed to the fixed body 4. Further, in this case, the first drive coil 24 may be fixed to the second holding body 3 or may be fixed to the fixed body 4.

In accordance with an embodiment of the present invention, it may be structured that the first drive magnet 23 is fixed to the magnet fixing member 14 and the second drive magnet 25 and the third drive magnet 27 are fixed to the fixed body 4 or the first holding body 2. Further, it may be structured that the first drive magnet 23 is fixed to the fixed body 4 and the second drive magnet 25 and the third drive magnet 27 are fixed to the magnet fixing member 14 or the first holding body 2. Further, it may be structured that the first drive magnet 23 is fixed to the first holding body 2 and the second drive magnet 25 and the third drive magnet 27 are fixed to the magnet fixing member 14 or the fixed body 4.

In the embodiment described above, the second holding body 3 is supported by the fixed body 4 through four wires 10. However, the present invention is not limited to this embodiment. For example, the second holding body 3 may be supported by the fixed body 4 through five or more wires 10. In this case, in order to appropriately restrain the inclination of the optical axis "L" at the time of correcting a shake, it is preferable that each of plural wires 10 is disposed either of the vicinities of four corners of the second holding body 3 when viewed in the upper and lower direction. Further, in a case that each of plural wires 10 is disposed either of the vicinities of four corners of the second holding body 3 when viewed in the upper and lower direction, the upper end sides of two or more wires 10 are fixed to at least one of four wire fixed parts 8*d*.

In the embodiment described above, the first drive magnet 23 is formed in a substantially triangular prism shape but the first drive magnet 23 may be formed in a roughly polygonal prism shape other than a triangular prism shape or may be formed in a roughly cylindrical shape or a roughly elliptic columnar shape. Further, in the embodiment described above, the first drive coil 24 is wound around in a substantially triangular shape but the first drive coil 24 may be wound around in a roughly multi-angular tube shape other than a substantially triangular shape or may be wound around in a roughly cylindrical tube shape or in a roughly elliptic tube shape.

In the embodiment described above, the first drive mechanism 5 is structured of the first drive magnet 23 formed in a substantially triangular prism shape, the first drive coil 24 which is disposed so that its inner peripheral face is oppositely disposed to the outer peripheral face of the first drive magnet 23 through a predetermined gap space, and the like. However, the present invention is not limited to this embodiment. For example, the first drive mechanism may be structured of a drive coil which is wound around in a substantially flat shape, a drive magnet which is disposed so as to face the drive coil, and the like. Alternatively, the first drive mechanism may be structured of an electromagnet provided with an iron core around which a coil is wound and a permanent magnet. Further, the second drive mechanism 6 and/or the third drive mechanism 7 may be structured of an electromagnet provided with an iron core around which a coil is wound and a permanent magnet. Alternatively, similarly to the first drive mechanism 5, the second drive mechanism 6 and/or the third drive mechanism 7 may be structured of a second drive magnet and a third drive magnet which are formed in a roughly prism shape and a second drive coil and a third drive coil which are wound around in a roughly tube shape.

In the embodiment described above, the second drive magnet 25 and the second drive coil 26 are disposed so that their thickness directions are substantially parallel to the front and rear direction and they face each other in the front and rear direction. However, the present invention is not limited to this embodiment. For example, the second drive magnet 25 and the second drive coil 26 may be disposed so that their thickness directions are substantially parallel to the optical axis direction and they face each other in the optical axis direction. Similarly, the third drive magnet 27 and the third drive coil 28 may be disposed so that their thickness directions are substantially parallel to the optical axis direction and they face each other in the optical axis direction.

In the embodiment described above, the lens drive device 1 is formed in a substantially square shape when viewed in the optical axis direction. However, the present invention is not limited to this embodiment. For example, the lens drive device 1 may be formed in a roughly rectangular shape when viewed in the optical axis direction or may be formed in another roughly quadrangular shape. Further, the lens drive device 1 may be formed in a roughly polygonal shape other than a roughly rectangular shape when viewed in the optical axis direction or may be formed in a roughly circular shape or a roughly elliptic shape when viewed in the optical axis direction.

In the embodiment described above, four side faces of the lens drive device 1 when viewed in the optical axis direction are substantially parallel to the right and left direction or the front and rear direction and the second drive mechanism 6 drives the second holding body 3 in the right and left direction and the third drive mechanism 7 drives the second holding body 3 in the front and rear direction. However, the present invention is not limited to this embodiment. For example, it may be structured that the second drive mechanism 6 drives the second holding body 3 in a predetermined direction which is substantially perpendicular to the optical axis direction and is inclined with respect to the right and left direction and the third drive mechanism 7 drives the second holding body 3 in a direction which is substantially perpendicular to the predetermined direction and the optical axis direction. For example, it may be structured that the second drive mechanism 6 drives the second holding body 3 in a direction which is substantially perpendicular to the optical axis direction and is inclined by +45° with respect to the right and left direction and the third drive mechanism 7 drives the second holding body 3 in a direction which is substantially perpendicular to the optical axis direction and is inclined by −45° with respect to the right and left direction.

In the embodiment described above, when viewed in the upper and lower direction, the center of the first holding body 2, the center of the second holding body 3 and the center of the fixed body 4 are substantially coincided with the optical axis "L". However, the present invention is not limited to this embodiment. For example, when viewed in the upper and lower direction, the center of the first holding body 2, the center of the second holding body 3 and/or the center of the fixed body 4 may be displaced from the optical axis "L".

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A lens drive device comprising:
   a first holding body configured to hold a lens and movable in an optical axis direction of the lens;
   a second holding body configured to hold the first holding body so that the first holding body is movable in the optical axis direction;
   a fixed body configured to hold the second holding body so that the second holding body is movable in a first direction and second direction, the first direction and the second direction being substantially mutually perpendicular and substantially perpendicular to the optical axis direction;
   a first drive mechanism which is structured to drive the first holding body in the optical axis direction;
   a second drive mechanism which is structured to drive the second holding body in the first direction;
   a third drive mechanism which is structured to drive the second holding body in the second direction;
   an elastic member having a fixed part which is fixed to the second holding body and a deformable part which is capable of being elastically deformed in the optical axis direction;
   plural wires in a substantially straight line shape each having a first end fixed to the deformable part and a second end fixed to the fixed body; and
   a connecting plate spring which connects the first holding body with the second holding body
   wherein the second holding body is supported by the fixed body so as to be movable in a direction substantially perpendicular to the optical axis direction through the plural wires;
   wherein the plural wires are inclined with respect to the optical axis direction so that the first ends of the plural wires are widened with respect to the second ends of the plural wires when viewed in the first or second direction;
   wherein the deformable part is elastically deformed in the optical axis direction by a force smaller than a buckling load of the wire;
   wherein the elastic member is a plate spring which is disposed so that its thickness direction; is the optical axis direction;
   wherein the plate spring and the connecting plate spring are integrally formed with each other.

2. The lens drive device according to claim 1, wherein the deformable part is disposed at four positions at a pitch of substantially 90° with a center of the second holding body as a substantial center, and
   the plural wires are inclined with respect to the optical axis direction so that the second ends of the plural wires are directed toward a center axis of the second holding body which is substantially parallel to the optical axis direction.

3. The lens drive device according to claim 2, wherein the plural wires are four wires and each of the four wires is fixed to each of the four positions of the deformable part.

4. The lens drive device according to claim 3, wherein the four wires are disposed so that two wires are superposed on each other when viewed in the first direction and two wires are superposed on each other when viewed in the second direction.

5. The lens drive device according to claim 2, wherein the first ends of the plural wires are fixed to the deformable part at a substantially equal distance from the center of the second holding body when viewed in the optical axis direction.

6. The lens drive device according to claim 5, wherein inclinations of the plural wires with respect to the optical axis direction when viewed in the first direction are substantially equal to inclinations of the plural wires with respect to the optical axis direction when viewed in the second direction.

7. The lens drive device according to claim 5, wherein
   the elastic member is disposed on one end side of the second holding body in the optical axis direction, and
   a center of a drive force of the second drive mechanism and a center of a drive force of the third drive mechanism in the optical axis direction are located on the one end side of the second holding body in the optical axis direction with respect to a center of the second holding body in the optical axis direction.

8. The lens drive device according to claim 5, further comprising an abutting member for preventing buckling of the wire,
   wherein the abutting member is abutted with the second holding body when the deformable part is elastically deformed in the optical axis direction, and
   wherein the abutting member is formed or fixed to the fixed body.

9. The lens drive device according to claim 1, wherein the one end sides of the plural wires are fixed to the deformable part at a substantially equal distance from the center of the second holding body when viewed in the optical axis direction.

10. The lens drive device according to claim 9, wherein the elastic member is disposed on one end side of the second holding body in the optical axis direction, and
    a center of a drive force of the second drive mechanism and a center of a drive force of the third drive mechanism in the optical axis direction are located on the one end side of the second holding body in the optical axis direction with respect to a center of the second holding body in the optical axis direction.

11. The lens drive device according to claim 9, further comprising an abutting member for preventing buckling of the wire,
    wherein the abutting member is abutted with the second holding body when the deformable part is elastically deformed in the optical axis direction, and
    wherein the abutting member is formed or fixed to the fixed body.

12. The lens drive device according to claim 9, further comprising a connecting plate spring which connects the first holding body with the second holding body,
    wherein the elastic member is a plate spring which is disposed so that its thickness direction is the optical axis direction; and
    wherein the plate spring and the connecting plate spring are integrally formed with each other.

13. The lens drive device according to claim 1, wherein inclinations of the plural wires with respect to the optical axis direction when viewed in the first direction are substantially equal to inclinations of the plural wires with respect to the optical axis direction when viewed in the second direction.

14. The lens drive device according to claim 13, further comprising a connecting plate spring which connects the first holding body with the second holding body,
   wherein the elastic member is a plate spring which is disposed so that its thickness direction is the optical axis direction; and
   wherein the plate spring and the connecting plate spring are integrally formed with each other.

15. The lens drive device according to claim 1, wherein the elastic member is disposed on one end side of the second holding body in the optical axis direction, and
   a center of a drive force of the second drive mechanism and a center of a drive force of the third drive mechanism in the optical axis direction are located on the one end side of the second holding body in the optical axis direction with respect to a center of the second holding body in the optical axis direction.

16. The lens drive device according to claim 1, further comprising an abutting member for preventing buckling of the wire,
   wherein the abutting member is abutted with the second holding body when the deformable part is elastically deformed in the optical axis direction, and
   wherein the abutting member is formed or fixed to the fixed body.

17. The lens drive device according to claim 1, further comprising a connecting plate spring which connects the first holding body with the second holding body,
   wherein the elastic member is a plate spring which is disposed so that its thickness direction is the optical axis direction; and
   wherein the plate spring and the connecting plate spring are integrally formed with each other.

* * * * *